United States Patent
Gall et al.

(10) Patent No.: US 7,362,931 B2
(45) Date of Patent: Apr. 22, 2008

(54) OPTICAL CONVERSION DEVICE FOR SHARED FTTH DISTRIBUTION NETWORK

(75) Inventors: Donald T. Gall, Port Aransas, TX (US); David M. Pangrac, Port Aransas, TX (US)

(73) Assignee: Pangrac & Associates Development, Inc., Post Aransas, TX (US)

( * ) Notice: Subject to any disclaimer, the term of this patent is extended or adjusted under 35 U.S.C. 154(b) by 13 days.

(21) Appl. No.: 11/380,806

(22) Filed: Apr. 28, 2006

(65) Prior Publication Data

US 2006/0245688 A1 Nov. 2, 2006

Related U.S. Application Data

(60) Provisional application No. 60/676,880, filed on May 2, 2005.

(51) Int. Cl.
G02B 6/28 (2006.01)
H04J 14/02 (2006.01)

(52) U.S. Cl. .............. 385/24; 398/67; 398/68; 398/72; 398/79; 398/82; 398/86; 398/87; 398/88

(58) Field of Classification Search .............. 385/24; 398/67, 68, 72, 79, 82–88
See application file for complete search history.

(56) References Cited

U.S. PATENT DOCUMENTS

| | | | |
|---|---|---|---|
| 4,421,383 A | 12/1983 | Carlsen | |
| 4,834,494 A | 5/1989 | DeMeritt et al. | |
| 5,193,135 A | 3/1993 | Miyagi | |
| 5,541,757 A * | 7/1996 | Fuse et al. | 398/72 |
| 5,694,234 A | 12/1997 | Darcie et al. | |
| 6,385,366 B1 | 5/2002 | Lin | |
| 6,427,035 B1 | 7/2002 | Mahony | |
| 6,522,804 B1 | 2/2003 | Mahony | |
| 6,530,087 B1 | 3/2003 | Kobayashi et al. | |
| 6,538,781 B1 | 3/2003 | Beierle et al. | |
| 6,678,442 B2 | 1/2004 | Gall et al. | |
| 7,218,855 B2 * | 5/2007 | Whittlesey et al. | 398/72 |
| 7,266,265 B2 * | 9/2007 | Gall et al. | 385/24 |
| 2002/0135844 A1 * | 9/2002 | Silberman et al. | 359/167 |
| 2003/0223750 A1 * | 12/2003 | Farmer et al. | 398/71 |
| 2004/0234269 A1 * | 11/2004 | Laamanen et al. | 398/135 |
| 2006/0097573 A1 * | 5/2006 | Gidge et al. | 307/3 |
| 2006/0127100 A1 * | 6/2006 | Frankel et al. | 398/158 |
| 2006/0269285 A1 * | 11/2006 | Farmer et al. | 398/72 |

\* cited by examiner

*Primary Examiner*—Michelle R. Connelly-Cushwa
*Assistant Examiner*—Rhonda S. Peace
(74) *Attorney, Agent, or Firm*—Gary R Stanford

(57) ABSTRACT

An optical conversion device for a shared FTTH distribution network including first and second optical fibers and an optical processing circuit. The optical processing circuit has an input for receiving a first optical analog signal carried by the first optical fiber and an output for providing a first optical digital signal for transmission via the second optical fiber. The optical processing circuit is configured to digitize the first optical analog signal and incorporate into the first optical digital signal. The optical analog signal may be an optical signal which is modulated by an RF signal, which is the same or similar to that of existing HFC networks. High loss electrical signals are converted to low-loss optical signals propagated within the optical plant. The combined optical analog and digital protocol supports analogous communications of existing HFC networks and the optical plant minimizes cost of fiber optic upgrade.

21 Claims, 13 Drawing Sheets

OPTICAL CONVERSION DEVICE FOR SHARED FTTH DISTRIBUTION NETWORK

CROSS-REFERENCE TO RELATED APPLICATIONS

This application claims the benefit of U.S. Provisional Application Ser. No. 60/676,880, filed on May 2, 2005, which is herein incorporated by reference for all intents and purposes.

This application is related to the following co-pending U.S. Patent Application, which has a common assignee and at least one common inventor, and which is herein incorporated by reference in its entirety for all intents and purposes:

| SERIAL NUMBER | DOCKET NUMBER | TITLE |
|---|---|---|
| — | PANG.0011A | LOW-LOSS SHARED FTTH DISTRIBUTION NETWORK |

BACKGROUND OF THE INVENTION

1. Field of the Invention

The present invention relates to fiber optic networks, and more particularly to an optical conversion device for a shared FTTH distribution network that enables reliable and cost effective optical communications to the home.

2. Description of the Related Art

Fiber To The Home (FTTH) is an attractive option that has received a significant amount of attention in recent years. Significant technological advances have been made in fiber optic communications. FTTH promises to deliver "true" broadband access compared to existing access technologies including network connections based on phone lines (DSL) or coaxial cable. The hybrid-fiber-coax (HFC) architecture is a relatively recent development adopted by the cable industry in which optical signals are transported from a source of distribution (e.g., a headend) to multiple electro-optical conversion nodes via fiber optic cables. Each conversion node converts between optical signals and electrical signals using simple photo-detector technology, where the electrical signals are carried via coaxial cables routed from the conversion nodes to individual subscriber locations. Each subscriber location is typically a residential location (e.g., home, duplex, apartment building, etc.) or a business location or the like, where each subscriber location supports one or more individual subscribers. Current HFC designs call for fiber nodes serving about 500 homes on the average, although the nodes could be further segmented to smaller coaxial-serving areas.

A "last mile" solution to achieve FTTH would appear to be to replace the coax cables of an HFC architecture with fiber optic cables. The traditional Passive Optical Network (PON) approach to FTTH is to route a separate optical fiber to each subscriber location. Such a solution, however, results in about 1,000 fibers on the average between each local node and the neighborhoods served (2 per house for full duplex). The average number of fibers behind each person's home in such a configuration is about 200. This has proved to be an unwieldy architecture that is difficult to establish and prohibitively expensive to maintain. FTTH has not yet proved to be cost effective to deploy and/or operate using conventional approaches.

Experience from the coaxial cable configurations has demonstrated that cable problems can and do occur. Generally, damage to one or more cables reduces or otherwise eliminates service in corresponding downstream geographic areas. Coaxial cables are relatively inexpensive and easy to replace and/or repair. Fiber optic cables, on the other hand, are relatively expensive and difficult to repair. In proposed configurations, each cable has a multitude of optical fibers. During the installation process, the individual fibers must be identified and isolated to route each fiber to the appropriate location. Fiber optic cable repair has typically required very specialized equipment involving a sophisticated splicing operation that must be done in a relatively clean environment. The solution has been a truck or "splicing van" loaded with very expensive fiber optic splicing equipment. The general process is to clean, align and splice, which involves melting and firing the individual fibers. The splicing van must be deployed to the specific trouble spot in the network. Although access may be readily available at or near major thoroughfares, such as highways or rural access routes where van access is readily available, such access is more problematic behind homes in neighborhoods and many other hard to reach or remote locations.

It is desired to solve the last mile dilemma so that FTTH can become a viable and economic reality.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

U.S. Pat. No. 6,678,442 entitled "Fiber Optic Connector For A Segmented FTTH Optical Network", which is incorporated herein by reference in its entirety, addressed many of the problems of the traditional PON architecture. The segmented FTTH optical network disclosed utilized some of the same logical principles as in an HFC architecture while replacing the last mile coaxial cables with segmented fiber. As described therein, an optic fiber was routed from a node near multiple subscriber locations, and taps and splitters subdivided the optical signal to each subscriber location. The present disclosure significantly improves upon the segmented FTTH optical network disclosed and described therein. In one aspect, an optical communication architecture is described which employs an optic network to enable communications with each subscriber location. In another aspect, the architecture employs a combined analog and digital protocol. In yet another aspect, the architecture is flexible enough to enable a unique optical lambda to be assigned to each subscriber along a single fiber feeding multiple customer premises. In yet another aspect, connectorless tap/splitters are used to reduce signal loss and increase signal budget, which is particularly useful for maintenance of the fiber plant. Optical connectors may still be employed for repair of any one or more optical segments. In yet another aspect, fiber optics replace the coaxial cables used in conventional HFC networks while supporting substantially the same communication and protocols used for HFC networks. The fiber optic plant operates as a "dumb-pipe" that supports existing communications to minimize cost of fiber optic upgrade, and further supports most variations of optical communications to minimize cost of future upgrades.

Figure 1:
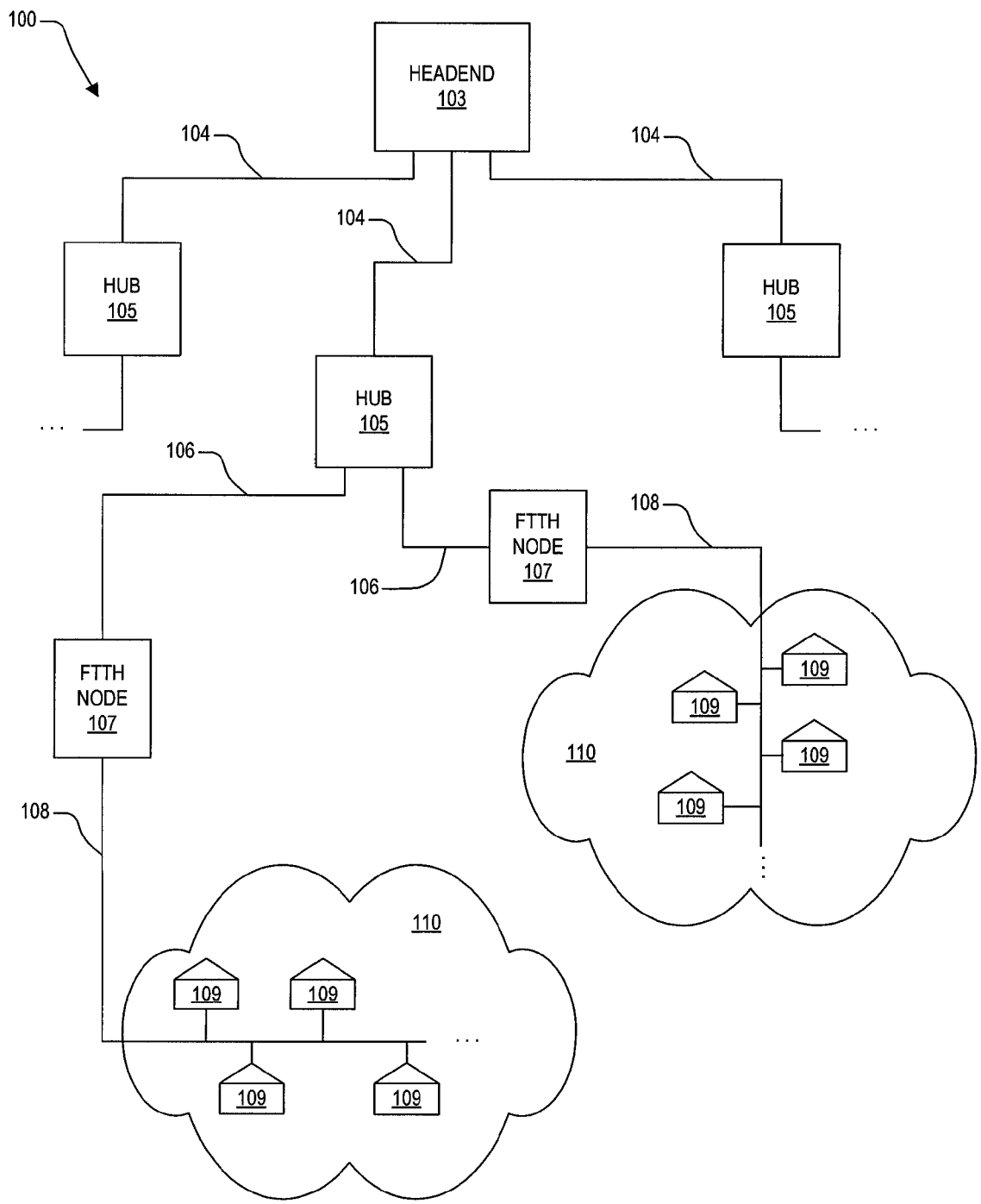
FIG. 1 is a simplified block diagram of an exemplary low-loss shared Fiber To The Home (FTTH) distribution network implemented according to an embodiment of the present invention.

FIG. 1 is a simplified block diagram of an exemplary low-loss shared Fiber To The Home (FTTH) distribution network 100 implemented according to an embodiment of the present invention. One or more sources (not shown) are coupled via appropriate communication links to deliver source information to a headend 103, which distributes the source information to one or more distribution hubs 105 via respective communication links 104. Each distribution hub 105 further distributes source information to one or more FTTH nodes 107 via communication links 106, where each FTTH node 107 in turn distributes the source information to one or more subscriber locations 109 via neighborhood links 108 routed to and throughout one or more zones 110. In the embodiment shown, bi-directional communication is supported in which subscriber information from any one or more of the subscriber locations 109 is delivered to the corresponding distribution hub 105 via the corresponding links 108 and FTTH nodes 107. Depending upon the nature of the subscriber information and the network architecture, the subscriber information may be delivered to the headend 103 or to an appropriate source by the corresponding distribution hub 105. The signals that provide source information from an "upstream" source, such as the headend 103 and/or the hubs 105 and/or the FTTH nodes 107, to the "downstream" subscriber locations 109 are referred to as "forward" signals and signals sourced from subscriber locations 109 towards the headend 103 are referred to as "reverse" signals.

It is noted that the headend 103, the distribution hubs 105, and the FTTH nodes 107, may generically be referred to as points of distribution for source and subscriber information. Each point of distribution supports a successively smaller geographic area. The headend 103, for example, may support a relatively large geographic area, such as an entire metropolitan area or the like. The larger geographic areas are further divided into smaller areas, each supported by a distribution hub 105. The areas supported by each distribution hub 105 are further divided into successively smaller areas, such as neighborhoods within the metropolitan area, each supported by a corresponding FTTH node 107. In the illustrated embodiment, each FTTH node 107 supports multiple zones 110 each including a range of subscriber locations. In one embodiment, each zone typically supports up to 60 subscriber locations and each FTTH node 107 supports up to 16 zones for a total of up to almost 1,000 subscriber locations (960 if each zone supports exactly 60 locations).

Many different types of sources are contemplated, such as computer or data networks, telephony networks, satellite communication systems, off-air antenna systems (e.g. microwave tower), etc. The computer networks may include any type of local, wide area or global computer networks, both public and private, such as including the Internet or the like. The telephony networks may include the public switched telephone network (PSTN) or other public or private telephony networks. The satellite communication systems and/or the antenna systems may be employed for reception and delivery of any type of information, such as television broadcast content or the like. The headend 103 may also include video on demand (VOD) equipment (not shown). Depending upon the network architecture, any one or more of the sources may be coupled directly to one or more of the distribution hubs, in the alternative, or in addition to being coupled to the headend 103. The headend 103 includes appropriate equipment for data transmission, such as, for example, internal servers, firewalls, IP routers and switches, signal combiners, channel re-mappers, etc.

The particular configuration of the distribution network 100 upstream from the headend 103 to the FTTH nodes 107 may be designed according to any suitable optical communication configuration. Each of the communication links 104 and 106 may be any appropriate media, such as electrical or fiber optic cables or wireless or the like, or any combination of media, such as electrical and optical media and wireless or multiple optical media, etc. The communication links 104 may comprise optical links, such as, for example, SONET (Synchronous Optical Network) links or the like. The communication links 106 also comprise optical fibers or cables that are distributed between each FTTH node 107 and a corresponding distribution hub 105. In one embodiment, the distribution network 100 is configured in a similar manner as an HFC distribution network, except that the links 108 are not coaxial cables and the FTTH nodes 107 do not convert between electrical and optical formats. Instead, the neighborhood links 108 comprise fiber optic cables that are distributed from each FTTH node 107 towards the respective subscriber locations 109 located in respective zones 110. As described further below, each link 108 includes optical taps and splitters that subdivide the optical signal path to multiple subscribers. Optical amplifiers may be used to amplify the optical signals where and when necessary or desired.

The method used for upstream optical communications depends on the protocols and architecture employed. If each optical fiber supports bi-directional communications, then each link 108 includes a single optical fiber segment routed to each subscriber location. An optical ribbon cable incorporating 4 separate optical fibers is contemplated for implementing each of the links 106. In the illustrated embodiments described below, each fiber of each link 106 is split into two signals at each FTTH node 107 forming two separate links 108 for each FTTH node 107. Each link 108 may also be implemented with an optical ribbon cable including 4 separate optical fibers for a total of 8 downstream fibers per FTTH node 107. It is noted, however, that the particular number of fibers provided to and distributed from each FTTH node 107 is arbitrary and depends upon the needs of the particular community and the optical communication methods employed. Many different types of electronic and optical communication protocols are possible and contemplated depending upon the particular communication and encoding methods chosen, such as Time Division Multiplexing (TDM) or Frequency Division Multiplexing (FDM) in the electrical domain. Either of these techniques can then be inserted into the optical domain using Wavelength Division Multiplexing (WDM), Coarse Wave Division Multiplexing (CWDM), or Dense WDM (DWDM), etc.

It is appreciated that the distribution network 100 including the FTTH configuration shown for solving the "last-mile" problem provides many advantages over networks that attempt to distribute a separate fiber from each FTTH node 107 to each subscriber location 109 of each supported zone, such as would be the case for the PON architecture. If the node supported 500 homes, it would require at least 500 separate optic fibers, each routed via a multi-fiber cable to each subscriber location. In contrast, the distribution network 100 distributes only a few optical fibers to each neighborhood, where each fiber is shared by multiple subscribers. Many communication protocols for enabling such shared optical communications are known and readily available, such as TDM, FDM, WDM, DWDM, etc. Since a reduced number of optical fibers are needed, the cost of routing optical cable from each FTTH node 107 to each subscriber location 109 is substantially reduced, resulting in a significantly more cost-effective network to establish. Furthermore, since the network includes substantially less fibers, it is significantly less costly to maintain.

The distribution network 100 employs a segmented configuration employing optical taps, splitters, amplifiers, etc., described below, that facilitate network configuration, and that further support the use of optical connectors for repair. Each FTTH node 107 generates enough optical power on each downstream optical fiber to allow a sufficient power loss budget for a certain number of optical connections and signal divisions. The power budget is chosen to provide a sufficient power level to each subscriber location 109 supported by that FTTH node 107 given the number of taps, splitters and connectors. Since only a limited number of subscriber locations 109 need be supported by each FTTH node 107, the power budget is sufficient to maintain communications in the last mile and to re-establish communications in an expedient, efficient and cost-effective manner. If a cable of the link 108 is compromised (e.g., broken, damaged, destroyed, etc.), it is quickly and easily replaced or repaired using optical connectors. The connectors used for repair may be left in the network or later replaced with low-loss fused connections. The fiber optic plant is initially designed with a sufficient optical signal loss budget to accommodate a suitable or predetermined number of connector-based repairs, the exact location(s) of which need not be known at the time of installation. This is different from other architectural approaches which require that loss budget be established to accommodate connectors on each fiber at each tap and splitter in the plant. This new design approach provides significantly reduced signal loss in both the downstream and upstream directions, thus allowing for a reduction or possible elimination of additional optical amplifiers between the node and the subscriber locations.

Figure 2:
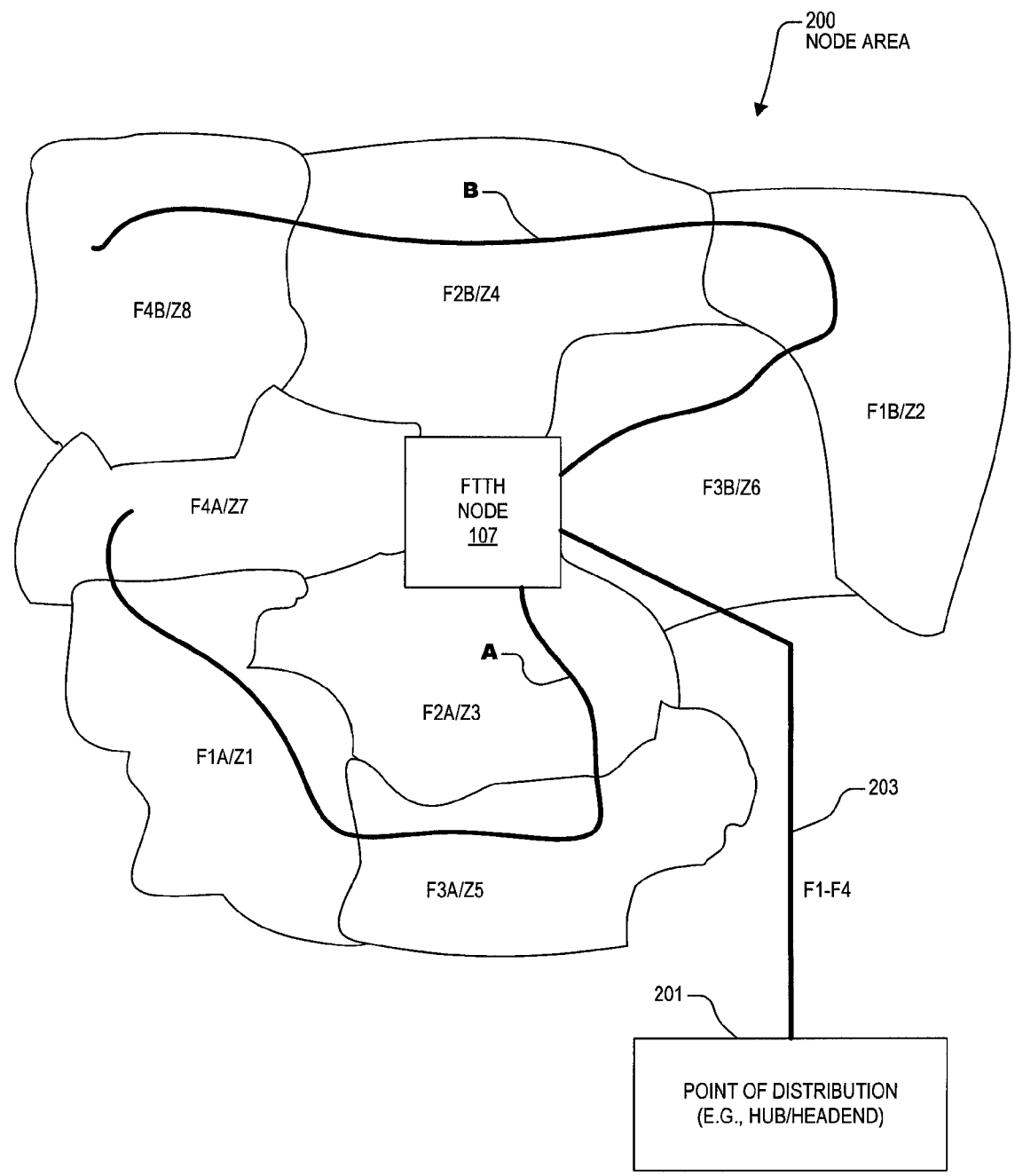
FIG. 2 is a simplified block diagram illustrating an exemplary node area serviced by a corresponding FTTH node with multiple zones for servicing up to approximately 500 subscriber locations.

FIG. 2 is a simplified block diagram illustrating an exemplary node area 200 serviced by a corresponding FTTH node 107 with multiple zones for servicing up to approximately 500 subscriber locations. A fiber optic cable 203 is routed between a point of distribution 201 to the FTTH node 107 of the node area 200. The point of distribution represents any hub 105 or the headend 103 or the like. In this configuration, the cable 203 includes four fibers F1, F2, F3 and F4 and the FTTH node 107 is a transportation amplifier that splits forward signals and combines reverse signals to service up to 16 zones, although only 8 zones are shown. For the node area 200, each primary fiber F1-F4 is split into two separate A and B fibers. In particular, the fiber F1 is divided into separate fibers F1A and F1B, the fiber F2 is divided into separate fibers F2A and F2B, and so on. The A fibers are grouped and routed via a cable labeled "A" and the B fibers are grouped and routed via a cable labeled "B". Each zone is a logical group of subscriber locations 109 that share forward and return path bandwidth, and typically pass (or support) up to 60 subscriber locations 109. As shown, the first cable A is routed from the FTTH node 107 to four zones Z1, Z3, Z5 and Z7 and the second cable B is routed from the FTTH node 107 to four zones Z2, Z4, Z6 and Z8, not necessarily in numeric order. The fibers F1A-F4A of cable A support zones Z1, Z3, Z5 and Z7, respectively, and the fibers F1B-F4B of cable B supports zones Z2, Z4, Z6 and Z8, respectively. If each zone Z1-Z8 represents up to 60 subscriber locations, then the node area 200 includes up to 480 subscriber locations. It is noted that each of the fibers F1A-F4A and F1B-F4B may further be divided by two to support an additional 8 zones for up to a total of 16 total zones or up to about 960 subscriber locations.

Figure 3:
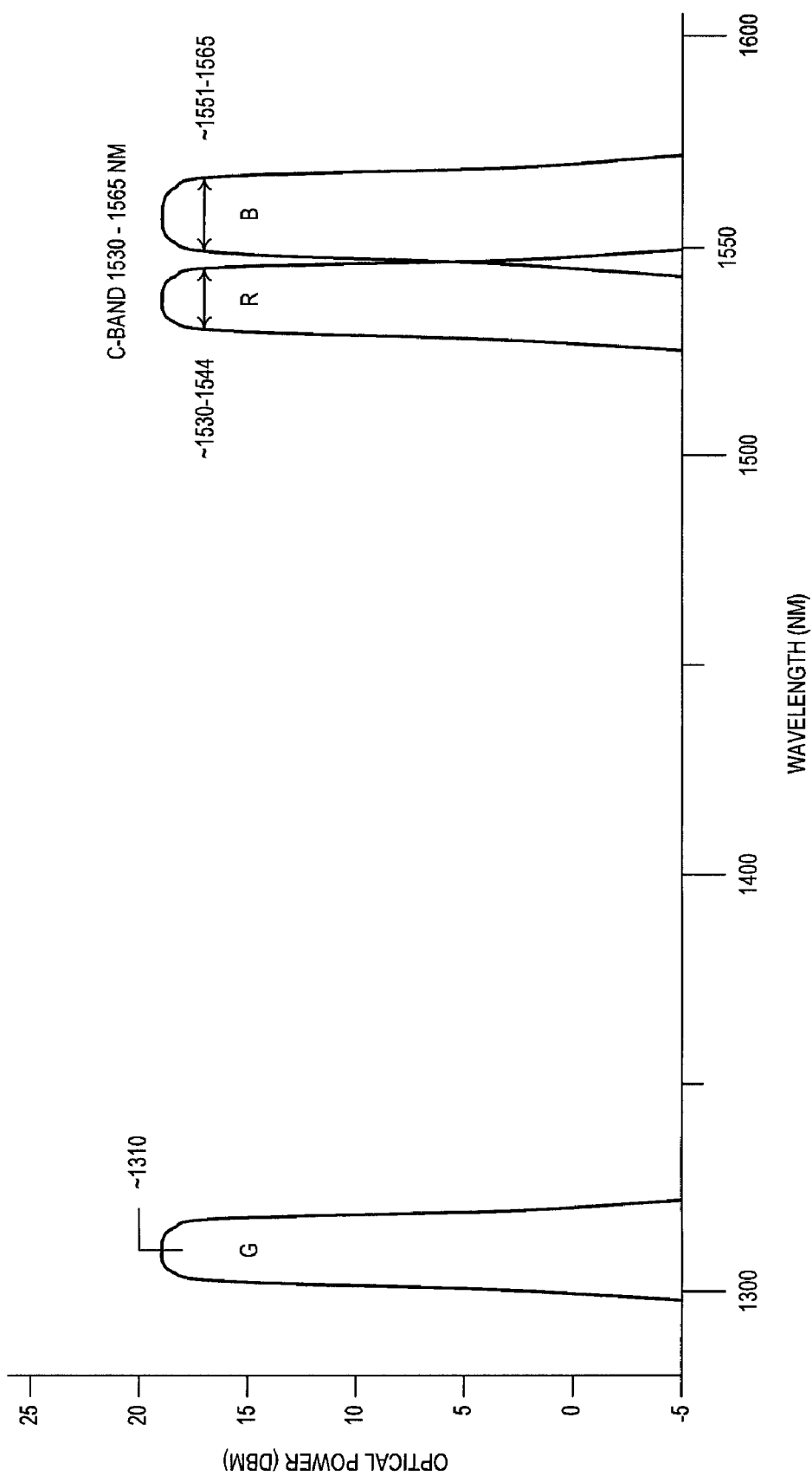
FIG. 3 is a graph diagram illustrating an exemplary optical frequency plan employed by the distribution network of FIG. 1 in which optical signal power in decibels referenced to 1 milliwatt (dBm) versus optical signal wavelength in nanometers (nm)

FIG. 3 is a graph diagram illustrating an exemplary optical frequency plan employed by the distribution network 100 in which optical signal power in decibels referenced to 1 milliwatt (dBm) versus optical signal wavelength in nanometers (nm). It is by no means the only possible frequency plan, or information format, but is illustrated as an exemplary embodiment for purposes of illustration. In this case, the conventional C-Band of 1530-1565 nm is employed, which is divided into a forward "red" signal "R" within a wavelength range of about 1530-1544 nm and a reverse "blue" signal "B" within a wavelength range of about 1551-1565 nm. For subscriber location generated communications, a reverse "green" signal "G" centered at about 1310 nm is used. The blue signals are digital signals and the green signals are analog signals, as further described below. The forward red signal could be either analog or digital and the various components of the network are independent of the form of the forward path signal. In the initial configuration, the downstream signal is analog, thus allowing existing cable operators to deploy these network components in existing HFC cable plants without changing any headend or customer premises equipment. The signal colors referenced herein do not refer to actual color of the optical signal but are used instead as color codes to distinguish the particular information that is multiplexed onto a single fiber via different optical frequency bands.

Figure 4:
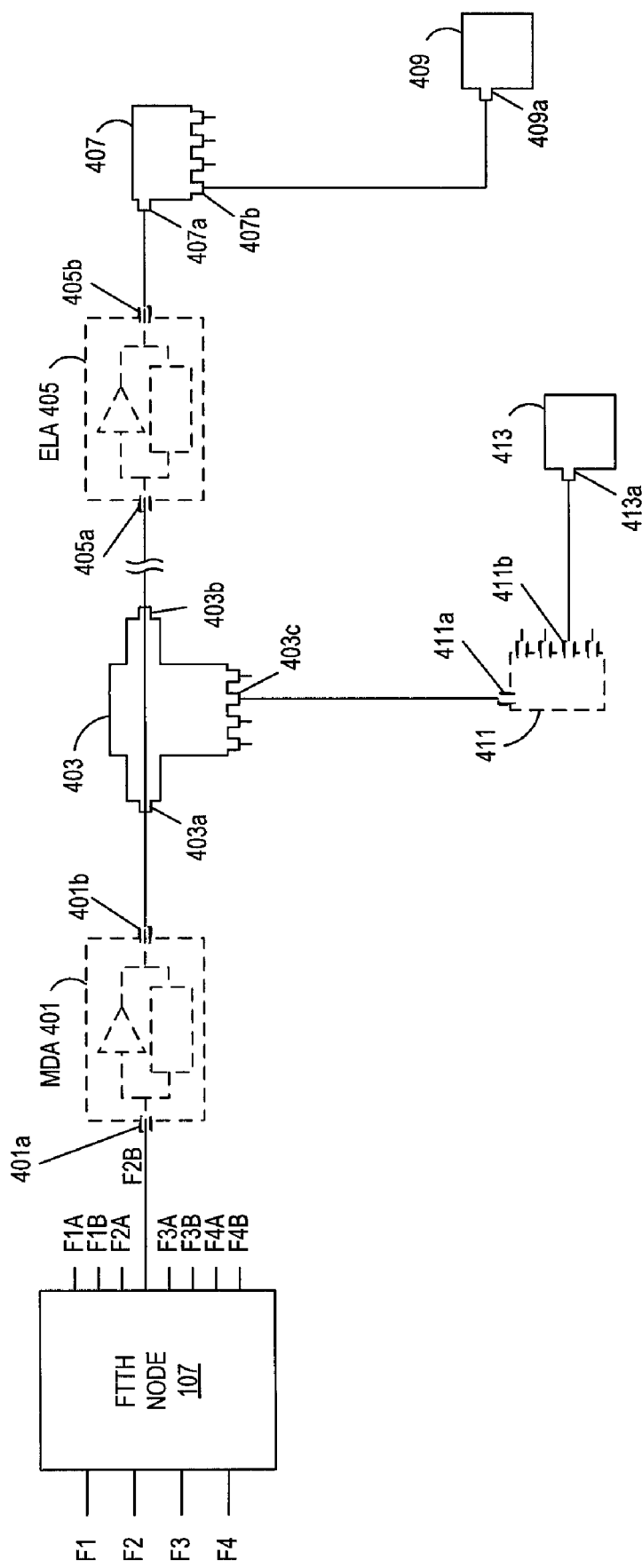
FIG. 4 is a schematic and block diagram of exemplary fiber optic paths from the FTTH node of FIG. 1 to selected network interface units (NIU) at corresponding subscriber locations.

FIG. 4 is a schematic and block diagram of exemplary fiber optic paths from the FTTH node 107 to selected network interface units (NIU) 409, 413 at corresponding subscriber locations 109. The NIUs 409 and 413 are substantially identical with each other. Each NIU is an active, bi-directional interface between the fiber distributed to the subscriber location 109 and a coaxial cable distributed to one or more of the devices (e.g., customer premises equipment or CPE) within the corresponding subscriber location 109. The FTTH node 107 is coupled to the 4 upstream fibers F1-F4 from the point of distribution 201 and provides up to eight downstream fibers F1A-F4A and F1B-F2B as previously described. A selected downstream fiber, F2B, of the FTTH node 107 is shown routed to an upstream input/output (I/O) port 401a of an optional middle distribution amplifier (MDA) 401, shown with dashed lines, or otherwise to an upstream I/O port of a tap or splitter device, such as the upstream I/O port 403a of tap/splitter 403. The MDA 401 is a distribution amplifier that amplifies the red signal in the forward direction and that receives, digitizes where necessary, and combines two reverse signals, e.g., blue (digital) and green (analog), into a single reverse blue (digital) signal.

The MDA 401 is shown with dashed lines since it is optional and only used for substantially long runs of fibers in which the optical communications possibly need amplification, or if the number of reverse path signals require digitization to avoid time collisions with other reverse path signals further upstream. The function of forwarding the red signal and combining and digitizing reverse analog green signals is performed by the FTTH node 107 so that the MDA 401 is otherwise not necessary. In most configurations, an MDA 401 is not necessary for several reasons. There is very little optical signal loss over miles of optical fiber, whereas coaxial cables exhibit substantial electrical signal loss in as little as one-quarter mile. Thus, HFC cable plants required a significant number of amplifiers downstream of each node. In comparison, there is very little loss of signal in an optic fiber such that the signal need not be amplified for a significant distance, such as up to 20 miles. And the FTTH node 107 is usually located within several miles of the subscriber locations (e.g., within 20 miles), such that intermediate amplification is not necessary. In some configurations, an MDA 401 might be employed if there are a significant number of taps and/or splitters positioned after the FTTH node 107 to amplify the diminished signal strength for additional subscriber locations. Also, the MDA 401 might be used without an amplifier to manage the collision domain for reverse signals.

The MDA 401 includes a downstream I/O port 401b coupled to the downstream fiber which is routed to and interfaced with the upstream I/O port 403a of the tap/splitter 403. An optical tap is a passive signal distribution device which divides a portion of a bidirectional signal of a fiber into two signals on separate fibers, where the signal division may be symmetrical or asymmetrical. A first divided fiber path is provided to a downstream I/O port 403b and the second divided fiber path is provided to an internal splitter which further splits the tapped signal between 2-8 downstream signals. The downstream I/O port 403b is interfaced with a downstream fiber which is shown routed to and interfaced with an upstream I/O port 405a of an optional end of line amplifier (ELA) 405, also shown using dashed lines, or otherwise to an upstream I/O port of a splitter device, such as the upstream I/O port 407a of a splitter 407. Each ELA is a distribution amplifier that manages the red signal in the forward direction and one or more green signals in the reverse direction. The ELA 405 is similar to the MDA 401 except that the ELA receives only green signals in the reverse direction and converts them to blue signals for transmission upstream in the reverse direction. In most configurations, the signal strength from the FTTH node 107 is sufficient for all subscriber locations so that ELAs are not necessary. Similar to the MDA 401, the ELA 405 might be employed only if there are a significant number of taps and/or splitters positioned after the FTTH node 107 and it is desired to amplify the diminished signal strength for additional subscriber locations, or if the number of reverse path signals require digitization to avoid time collisions with other reverse path signals further upstream.

The ELA 405 is shown with a downstream I/O port 405b which is coupled to a downstream fiber which is routed to and interfaced with the upstream I/O port 407a of the splitter 407. The splitter 407 internally splits the upstream path from the ELA 405 into multiple downstream paths coupled via a corresponding number of downstream I/O ports. A selected downstream I/O port 407b of the splitter 407 is shown coupled to a downstream fiber which is routed to and interfaced with the external I/O port 409a of the NIU 409 at a corresponding subscriber location.

Referring back to the tap/splitter 403, the second divided fiber path is further internally split into a number of separate downstream signal paths provided via separate tapped I/O ports of the tap/splitter 403. A selected tapped I/O port 403c of the tap/splitter 403 is coupled to a downstream fiber which is routed to and interfaced with an upstream I/O port 411a of an optional splitter 411, which is substantially similar to the splitter 407. A selected downstream I/O port 411b of the splitter 411 is interfaced to the upstream I/O port 413a of the NIU 413 at a different subscriber location. The splitter 411 is shown with dashed lines as it illustrates an optional configuration. In most typical situations, the tapped ports of the tap/splitter 403 would be coupled directly to NIUs of subscriber locations for a symmetrical configuration rather than being further split as illustrated.

Figure 11:
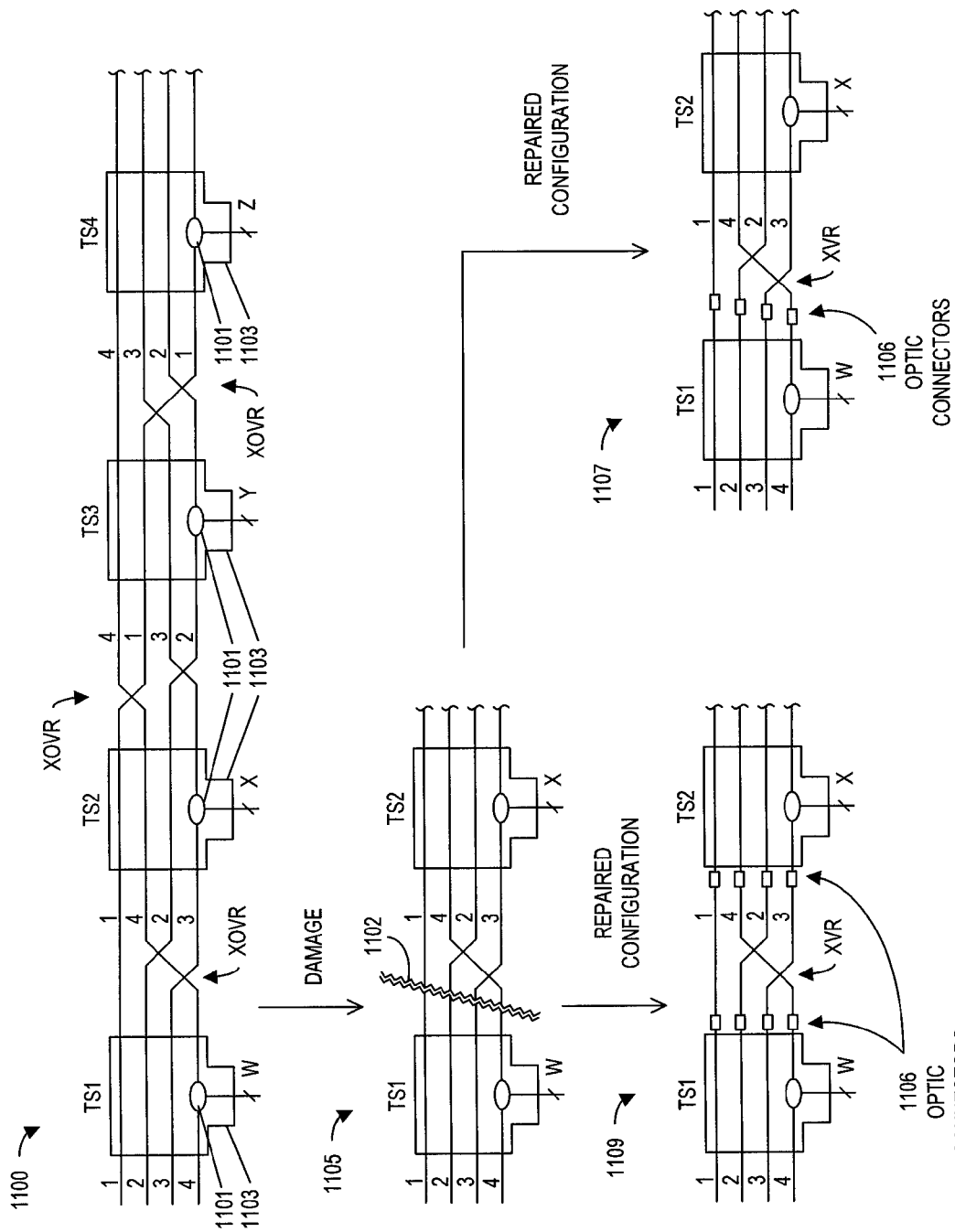
FIG. 11 is a diagram illustrating an implementation and use of the exemplary embodiment of the tap/splitter shown in FIG. 10.

In a typical symmetrical configuration, for example, the fiber optic stretch downstream of the tap/splitter 403 includes multiple tap/splitters in a series configuration, such as illustrated by the tap/splitters TS1, TS2, TS3 and TS4 of an initial configuration 1100 distributed along a fiber path of multiple fibers as shown in FIG. 11. The individual optical fibers numbered 1-4 in FIG. 11 represent the individual optical fibers of an optical cable such as cable A or B shown in FIG. 2 (e.g., optical fibers F1A-F4A or F1B-F4b). Each of the tapped ports of each tap/splitter in the series configuration supports an individual subscriber location. And the last downstream I/O port of the last tap/splitter in the series configuration is either terminated or linked to a last splitter, such as the splitter 407, for supporting the last subscriber locations supported by the fiber cable from the FTTH node 107.

The red signals from the FTTH node 107 are provided to the tap/splitter 403, which forwards red signals to the optional splitter 411 and to the splitter 407 (via any intermediate tap/splitters). The splitter 411 forwards a split portion of the tapped and split red signal to the NIU 413, and the splitter 407 forwards a split portion of the red signal to the NIU 409. The NIU 409 receives forward red signals from the splitter 407 and provides communications from its subscriber location in the reverse direction via a corresponding analog green signal. The splitter 407 is a passive device which combines reverse green signals from multiple subscriber locations and forwards a combined green signal upstream. The NIU 413 receives forward red signals from the splitter 411 and provides communications from its subscriber location in the reverse direction via a corresponding analog green signal. The splitter 411 is a passive device which combines reverse green signals from multiple subscriber locations and forwards the combined green signal upstream to the tap/splitter 403. The tap/splitter 403 is also a passive device which passes reverse green signals (e.g., from splitter 411 and NIU 413) in the reverse direction to the FTTH node 107 or to the optional MDA 401. As described further below, the FTTH node 107 transmits the red signals to the NIUs (e.g., 409, 413) at the subscriber locations 109 in the forward direction, and converts green signals from the subscriber locations 109 in the reverse direction to a blue signal which is forwarded upstream. The FTTH node 107 also combines any blue reverse signals received from the optional MDA 401 or the optional ELA 405 with the green reverse signals into a combined blue signal, which is forwarded in the reverse direction upstream.

An ELA (e.g., ELA 405), if used, converts reverse analog green signals from multiple downstream subscriber locations into a reverse digital blue signal, which is forwarded in the reverse direction upstream. The tap/splitter 403 is a passive device which simply forwards blue and green signals in the reverse direction. An MDA (e.g., MDA 401), if used, is designed to combine green and any blue reverse signals into a combined blue signal, and to forward the combined blue signal upstream. In particular, the MDA 401 converts upstream analog green signals into a digital blue signal, combines digital blue signals into a combined reverse digital blue signal, and forwards the combined reverse digital blue signal upstream.

Figure 5:
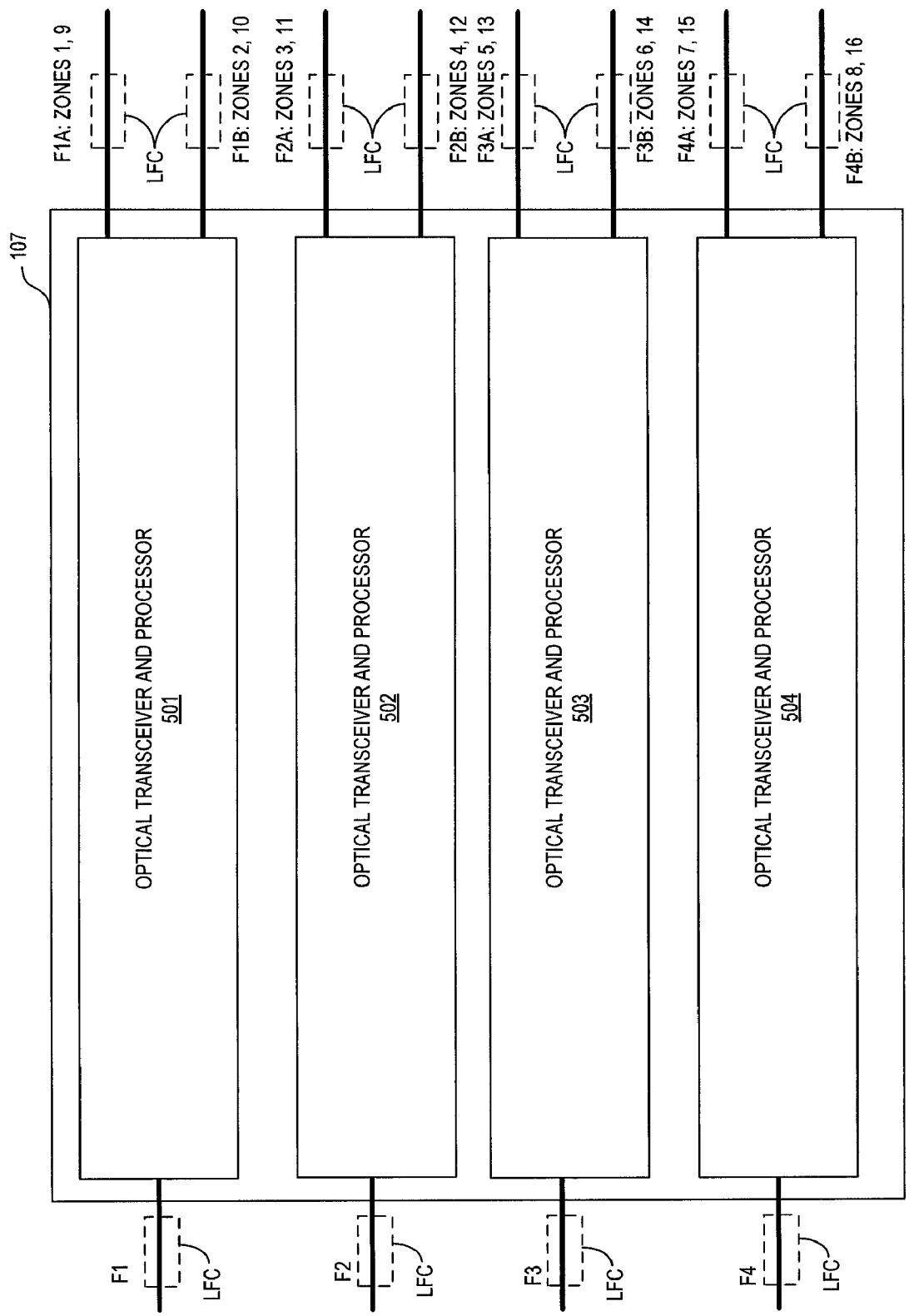
FIG. 5 is a logical block diagram of an exemplary embodiment of an FTTH node of FIG. 1.

FIG. 5 is a logical block diagram of an exemplary embodiment of the FTTH node 107. The fibers F1-F4 are each coupled via respective low-loss fiber couplings, denoted LFC, to respective one of four optical transceiver and processors 501, 502, 503 and 504 of the FTTH node 107. Each fiber coupling LFC, as used throughout this disclosure and in the Figures, is shown with a dotted line and represents a continuous fiber (i.e., straight-through fiber without connector and only signal loss if via the fiber itself), or a fused fiber connection (i.e., two fibers with ends fused together with negligible signal loss). A fiber coupling denoted FC, represents either an LFC or an SC/APC fiber connector (with associated connector losses). A straight-through fiber is the optimal solution providing a continuous, uninterrupted fiber run. The initial network configuration includes as many straight-through fibers as possible and using as few fiber connectors as possible. A fused connection is the next best connection since it inserts only negligible loss as known to those skilled in the art. Fused connections are in an initial configuration only on the particular fiber which is tapped or split at splitters or tap/splitters. The remaining fibers that pass through tap/splitters are straight-through fibers in the initial configuration. A fiber connector provides the benefit of easy connection and disconnection but inserts signal loss. Fiber connectors are typically used for connecting subscriber locations to splitters (e.g., between the splitter 411 and the NIU 413 and between the splitter 407 and the NIU 409), and as a temporary solution for making repairs.

One reason for this variation of connection points is that the connection may change over time. In an initial configuration of the distribution network 100, most fibers are continuous with fused connections only when actually being tapped or split. In the event of damage to a fiber cable in which the cable or one or more fibers are sliced or cut, a fiber cable portion might be replaced with new cable and fiber connectors may be initially used to re-establish connection for each of the individual fibers. A "segment" or portion of a fiber cable, meaning the fiber cable positioned between adjacent devices (nodes, splitters, taps, amplifiers, NIUs, etc.), is easily replaced since it is relatively easy to identify a break in communications between adjacent devices. For example, if a fiber cable located between a splitter and a tap/splitter is damaged, then a new fiber cable may be connected between these two components using fiber connectors for each connection point and the remaining system remains unchanged. If the actual point of damage is identified, then the actual point of damage may be repaired without replacing the whole segment. If fiber connectors are used for the repair, then eventually those fiber connectors may replaced with fused connections. As described above, a fused connection is superior to a fiber connector in that a fused connection inserts only negligible loss. The architecture according the present invention, however, provides sufficient signal budget to allow relatively generous use of fiber connectors for certain connection points and for substantially all repairs. The fiber connectors insert some loss, but the budget allows the fiber connectors to remain for as long as necessary and even allow them to be permanent connections.

In this manner, it is appreciated that the fibers of the initial network configuration are "continuous" with a minimal number of fiber connections or fused fibers. In the event of damage, the point of damage is repaired with a connector or fused connection, or a cable segment with the damage is identified and replaced with a new cable segment using fiber connectors or fused connections, or a new segment of cable with connectors on each end is connected between the damaged ends of the original cable whereon connectors have been attached. Such replacement is relatively inexpensive and can be made very quickly and conveniently to bring the network up to operational status with minimal impact to the affected subscriber locations. A splicing van or the like is only necessary if convenient to make fused connections. And if connectors are used, then the connectorized fiber cable may remain operable in the network indefinitely. Eventually, the fiber connectors are optionally removed and the individual fibers fused together to remove the signal loss associated with the connectors. Such replacement may be performed at a subsequent and more convenient time.

Referring back to FIG. 5, each of the optical transceiver and processors 501-504 amplifies and splits the downstream red signal into two separate signals onto two separate downstream fibers via a corresponding fiber coupling LFC. As shown, the upstream fiber F1 is split into the two separate downstream physical fibers F1A and F1B by the optical transceiver and processor 501, the upstream fiber F2 is split into the two separate downstream physical fibers F2A and F2B by the optical transceiver and processor 502, the upstream fiber F3 is split into the two separate downstream physical fibers F3A and F3B by the optical transceiver and processor 503, and the upstream fiber F4 is split into the two separate downstream physical fibers F4A and F4B by the optical transceiver and processor 504. Each of the fibers F1A-F4A and F1B-F4B supports up to 2 zones each (e.g., F1A for zones 1 and 9, F2A for zones 2 and 10, F2A for zones 3 and 11, F2B for zones 2 and 12, F3A for zones 5 and 13, F3B for zones 6 and 14, F4A for zones 7 and 15, and F4B for zones 8 and 16). The node area 200 previously described was shown supporting one zone per fiber F1A-F4A and F1B-F4B, where an additional zone per fiber could be supported in the illustrated embodiment.

Figure 6:
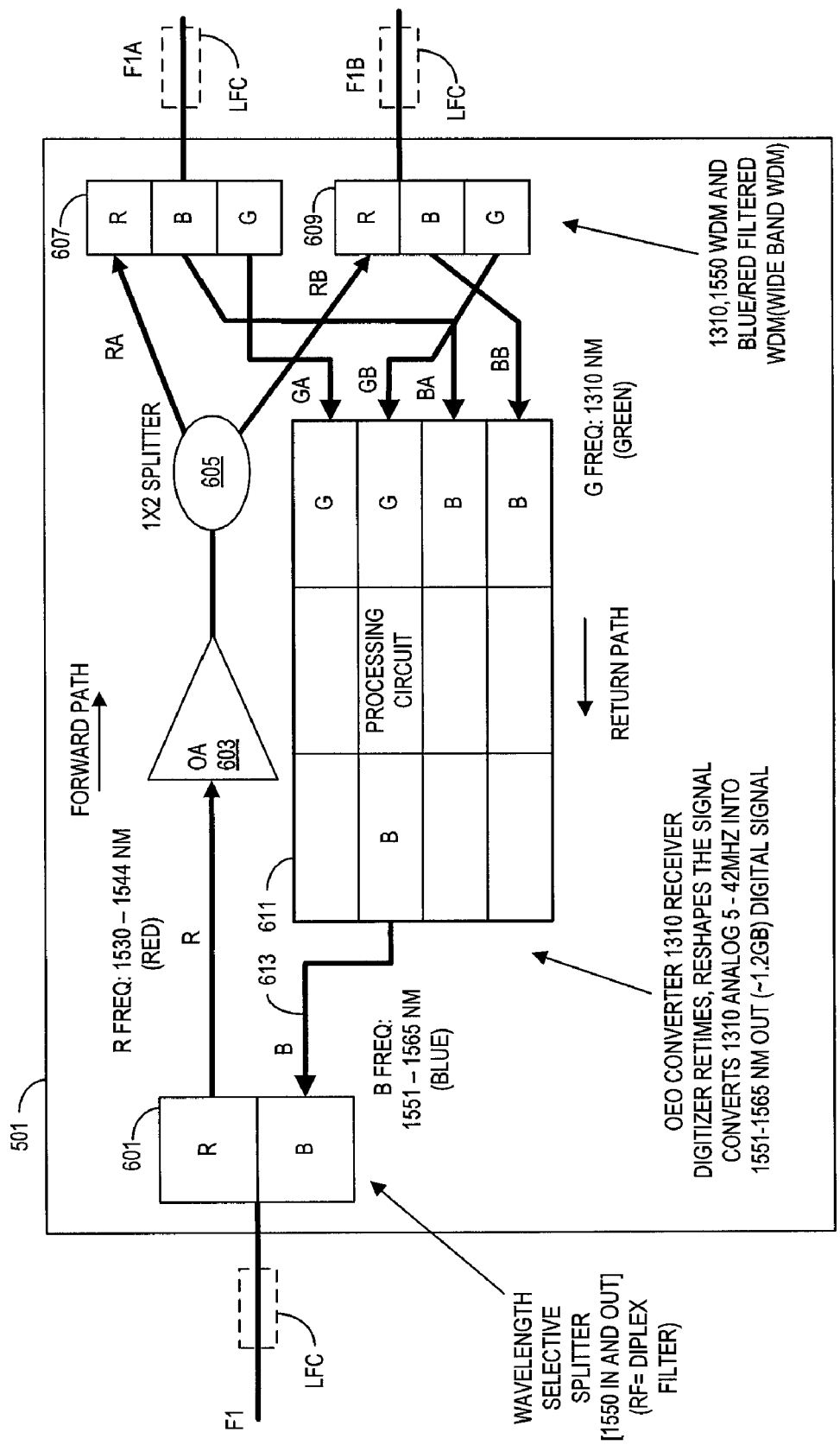
FIG. 6 is a more detailed schematic and block diagram of the optical transceiver and processor of FIG. 5.

FIG. 6 is a more detailed schematic and block diagram of the optical transceiver and processor 501. The optical transceiver and processors 502-504 are configured in substantially identical manner and thus are not further shown or described. The fiber F1 from the point of distribution 201 is coupled to a wavelength selective splitter 601 of the optical transceiver and processor 501 through a fiber coupling LFC. The red signal is provided to the input of an optical amplifier 603, having its output coupled to an input of an optical splitter 605. The splitter 605 is a 1×2 splitter which evenly splits the red signal power into two separate red signals RA and RB provided to respective inputs of first and second WDM filters 607 and 609. The first WDM filter 607 passes the forward red signal RA to the downstream fiber run F1A for routing to and supporting zones 1 and 9. The fiber F1A is coupled to the WDM filter 607 which provides respective reverse green and blue signals GA and BA to respective green and blue inputs of a processing circuit 611 within the optical transceiver and processor 501. In a similar manner, the second WDM filter 609 passes the forward red signal RB to the downstream fiber run F1B for routing to and supporting zones 2 and 10. The fiber F1B is coupled to the WDM filter 609, which provides reverse green and blue signals GB and BB to respective green and blue inputs of the processing circuit 611.

In one embodiment, the reverse green signals are modulated with 5-42 MHz radio frequency (RF) signals. The processing circuit 611 includes an Optical to Electrical to Optical (OEO) converter which re-times and re-shapes the signal for converting the green 1310 nm RF signal into a blue 1551-1565 nm digital output signal (approximately 1.2 gigabits). In this manner, the upstream analog green signals are converted to a blue digital signal which is combined with the reverse blue signals from the WDM filters 607, 609 to generate a single combined blue signal B on optical signal path 613 at the output of the processing circuit 611. The combined blue signal on path 613 is provided to the wavelength selective splitter 601 for providing the blue signals upstream to the point of distribution 201. The subscriber locations in the zones 1 and 9 serviced by the FTTH node 501 receive the red signal sourced from the point of distribution 201. The reverse signals generated by each and every subscriber location in zones 1 and 9 are provided to the point of distribution 201 via the FTTH node 501.

Figure 7:
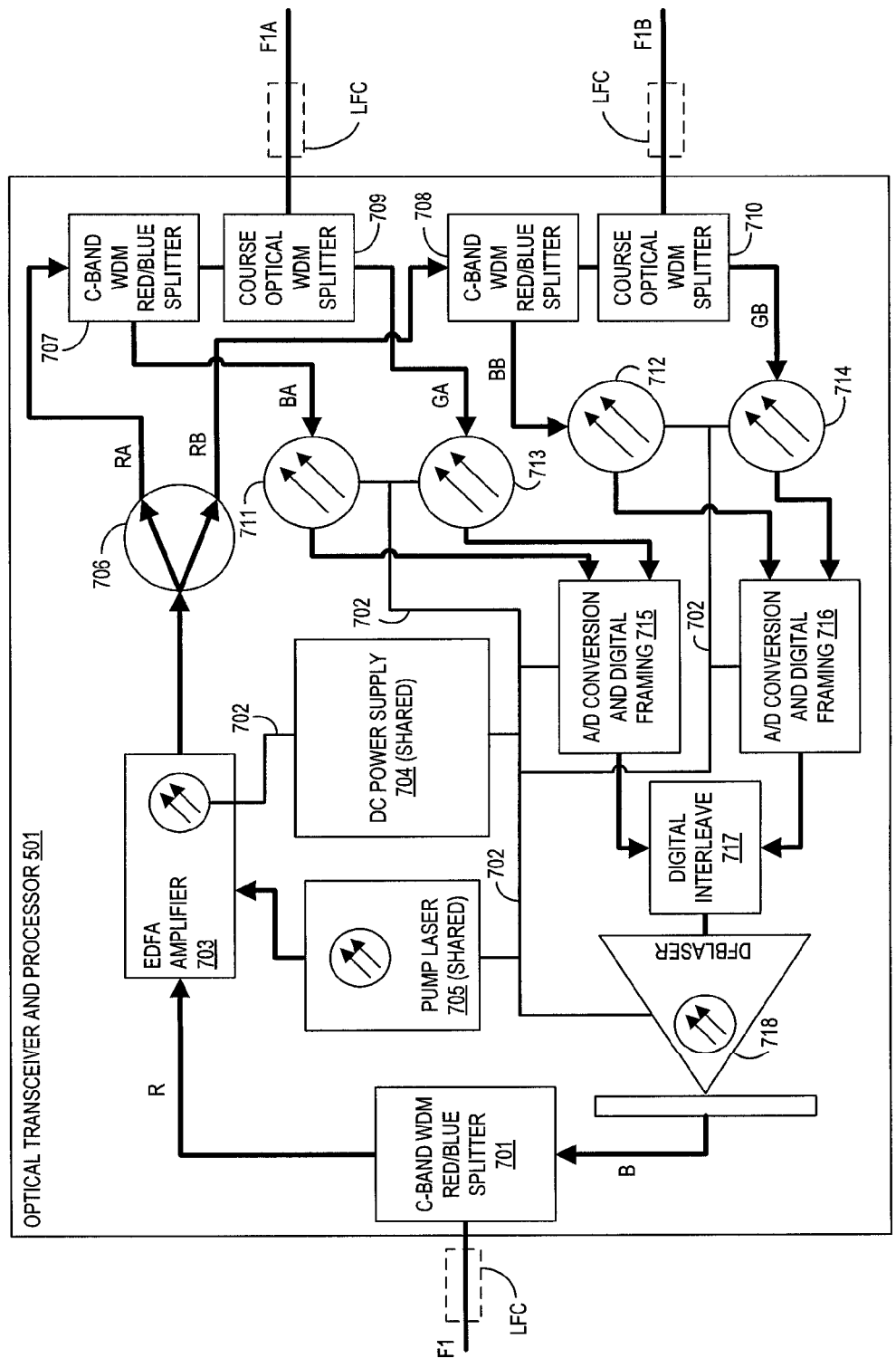
FIG. 7 is a more detailed schematic and block diagram of the optical transceiver and processor of FIG. 5.

FIG. 7 is a more detailed schematic and block diagram of the optical transceiver and processor 501. The fiber F1 is coupled via a fiber coupling LFC to a C-Band WDM Red/Blue splitter 701, which splits and provides the red forward signal to an optical amplifier 703. A DC power supply 704 provides power to the amplifier 703 and other components (including photo diodes) of the optical transceiver and processor 501 as illustrated by a power bus 702. The DC power supply 704 may be a central supply that is shared among the optical transceivers and processor 501-504 of a given FTTH node 107. The DC power supply 704 provides power to a pump laser 705 used by the amplifier 703 to amplify the forward red signal. The pump laser 705 may also be shared among the optical transceivers and processor 501-504 of the FTTH node 107. The amplified red signal is provided to an optical splitter 706, which provides the first red signal portion RA to a C-Band WDM red/blue splitter 707 and which provides the second red signal portion RB to another C-Band WDM red/blue splitter 708. The C-Band WDM red/blue splitter 707 provides the red signal RA to a course optical WDM splitter 709, which provides the red signal RA onto the fiber F1A. Likewise, the C-Band WDM red/blue splitter 708 provides the red signal RB to another course optical WDM splitter 710, which provides the red signal RA onto the fiber F1B.

The fiber F1A is coupled to the course optical WDM splitter 709, which splits the red and blue signals from the reverse green signal GA and provides the reverse green signal GA to a photo diode 713. The photo diode 713 converts GA from light to an electrical analog signal and provides it to one input of an analog to digital (A/D) conversion and digital framing circuit 715. The course optical WDM splitter 709 provides the reverse blue signal BA to the C-Band WDM red/blue splitter 707, which splits and provides the reverse blue (digital) signal BA to a photo diode 711. The photo diode 711 converts BA from light to an electrical digital signal and provides it to another input of the A/D conversion and digital framing circuit 715. The A/D conversion and digital framing circuit 715 digitizes the electrical analog signal, combines it with the digital return path signals from 711 and provides it to a first input of a digital interleave circuit 717. In a similar manner, fiber F1B is coupled to the course optical WDM splitter 710, which splits the red and blue signals from the reverse green signal GB and provides the reverse green signal GB to a photo diode 714. The photo diode 714 converts GB from light to an electrical analog signal and provides it to a first input of another A/D conversion and digital framing circuit 716. The course optical WDM splitter 710 provides the reverse blue signal BB to the C-Band WDM red/blue splitter 708, which splits and provides the reverse blue signal BB to a photo diode 712. The photo diode 712 converts BB from light to an electrical digital signal and provides it to a second input of the A/D conversion and digital framing circuit 716.

The A/D conversion and digital framing circuit 716 digitizes the analog RF signal, combines it with the digital return path signals from 712 and provides it to a second input of the digital interleave circuit 717. The digital interleave circuit 717 interleaves the digital signals from the A/D conversion and digital framing circuits 715 and 716 and provides a combined and interleaved signal to an input of a laser 718. The laser 718 provides the combined reverse digital blue signal to an input of the red/blue splitter 701, which provides the reverse signal onto the fiber F1 for delivery to the point of distribution 201.

Figure 8:
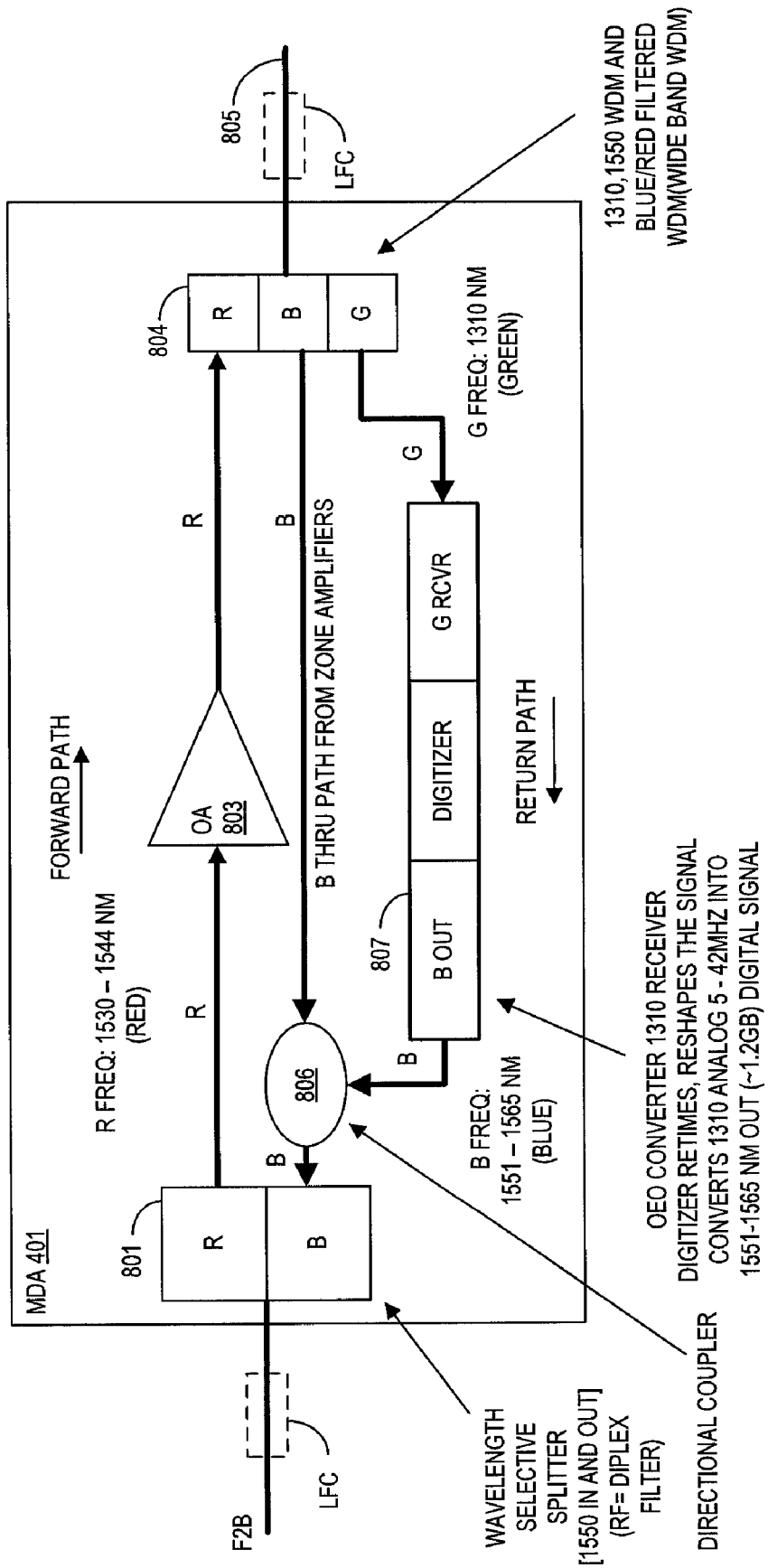
FIG. 8 is a schematic and block diagram of an exemplary embodiment of the MDA of FIG. 4.

FIG. 8 is a schematic and block diagram of an exemplary embodiment of the MDA 401. The MDA 401 is configured in a similar manner as the optical transceiver and processor 501 and includes similar components. As shown, the fiber F2B from the FTTH node 107 is provided through a fiber coupling LFC to a wavelength selective splitter 801, which operates in a similar manner as the splitter 601 to deliver a red signal in the forward direction and a blue signal in the reverse direction. The forward red signal is shown provided to an optical amplifier (OA) 803, which provides an amplified red signal to an input of a WDM filter 804. The WDM filter 804 provides the forward red signal onto a downstream fiber 805 coupled via a fiber coupling LFC. In an alternative configuration, the optical amplifier 803 is eliminated and the forward red signal is provided directly to the WDM filter 804 from the wavelength selective splitter 801. The MDA 401, for example, may be inserted for managing the reverse signal collision domain rather than for amplifying the forward red signal. The downstream fiber 805 is routed to another component, such as the tap/splitter 403 as previously described. A digital blue reverse signal on the fiber 805 is passed by the WDM filter 804 and provided to one input of a directional coupler 806 within the MDA 401. An analog green reverse signal on the fiber 805 is passed by the WDM filter 804 and provided to the input of a processing circuit 807. The processing circuit 807 includes a subset of the circuitry of the processing circuit 611, and operates to convert the reverse analog green signal into a digital blue signal, which is provided to another input of the directional coupler 806. The digital blue signal provided by the processing circuit 807 is carried on a different wavelength within the blue frequency band that does not overlap the wavelength of the laser of processing circuit 907 in the downstream ELA 405, which is described further below. Thus the directional coupler 806 can passively combine the two blue digital signals without the need for expensive digital framing and interleaving. The directional coupler 806 combines the blue signals and passes the combined blue signal to a reverse input of the wavelength selective splitter 801, which provides the combined reverse blue signal onto the fiber F2B. In an alternative embodiment, the MDA 401 includes a more comprehensive processing circuit, such as one including similar functions as the processing circuit 611, which combines the digital blue signals into a combined digital signal provided to the wavelength selective splitter 801.

Figure 9:
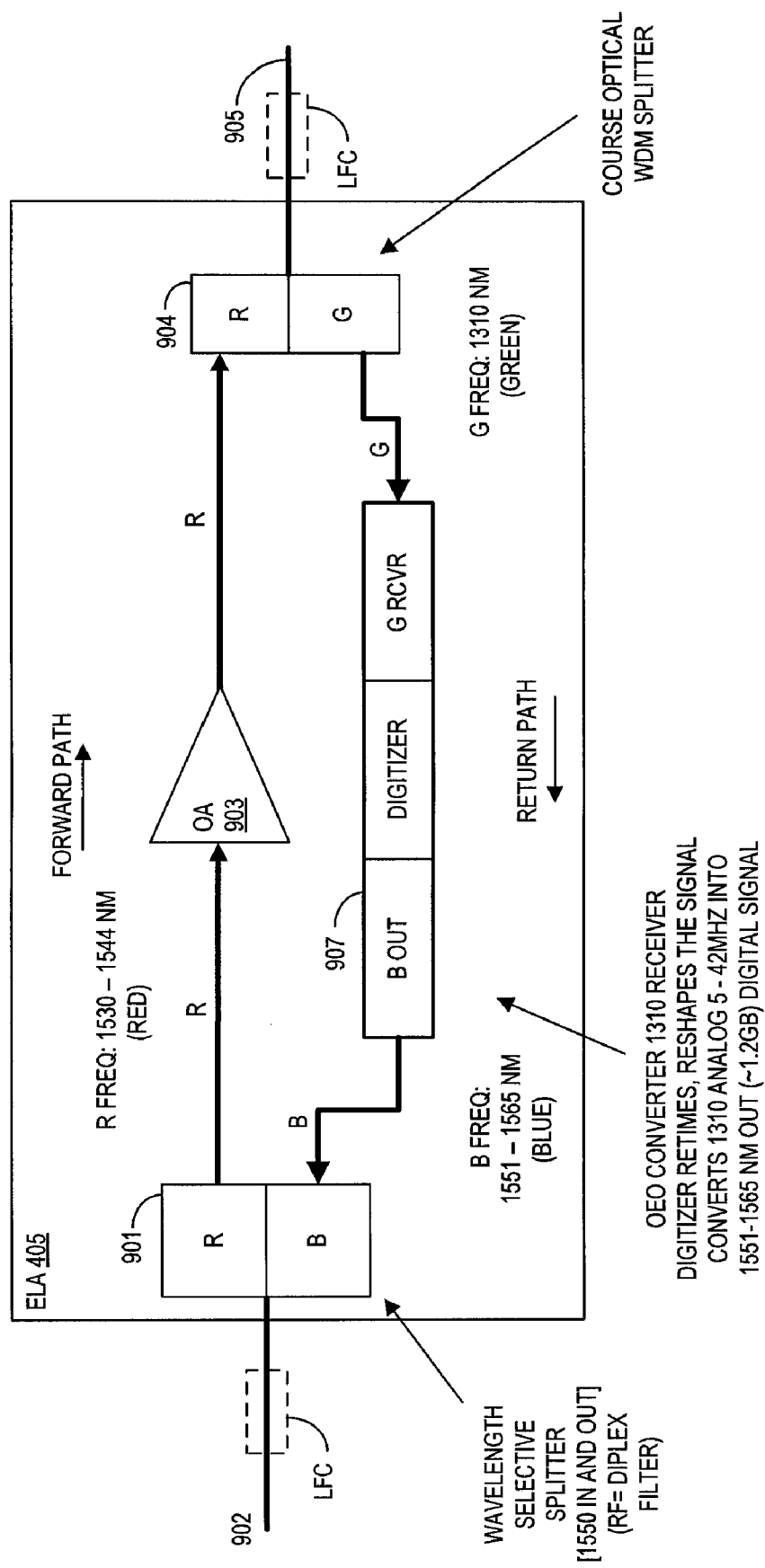
FIG. 9 is a schematic and block diagram of an exemplary embodiment of the ELA of FIG. 4 which is an optical amplifier that may be used to implement and any other ELA or zone amplifier in the communication network of FIG. 1.

FIG. 9 is a schematic and block diagram of an exemplary embodiment of the ELA 405 which is an optical amplifier that may be used to implement and any other ELA or zone amplifier in the distribution network 100. The ELA 405 is configured in a similar manner as the MDA 401 and includes similar components in a somewhat simplified configuration. An upstream fiber 902 is provided via a fiber coupling LFC to a wavelength selective splitter 901, which operates in a similar manner as the splitter 601 to deliver a red signal in the forward direction and a blue signal in the reverse direction. The forward red signal is provided to an optical amplifier 903, which amplifies the red signal. The amplified red signal is provided to an input of a course WDM splitter 904, which provides the forward red signal onto a downstream fiber 905 coupled via a fiber coupling LFC. In an alternative configuration, the optical amplifier 903 is eliminated and the forward red signal is provided directly to the WDM splitter 904 from the wavelength selective splitter 901. The ELA 405, for example, may be inserted for managing the reverse signal collision domain rather than for amplifying the forward red signal. An analog green reverse signal on the fiber 905 is passed by the WDM splitter 904 and provided to a processing circuit 907, substantially similar to the processing circuit 807, which converts the reverse analog green signal into a digital blue signal. One difference between processing circuit 807 and the processing circuit 907 is that processing circuit 907 includes a laser that operates on a slightly different wavelength within the blue frequency band that does not overlap the wavelength of the laser of processing circuit 807 in the MDA 401. This enables the use of the less expensive directional coupler 806 within the MDA 401 as previously described. The reverse digital blue signal is provided to a reverse input of the wavelength selective splitter 901, which passes the combined reverse blue signal onto the upstream fiber 902. The specific details of the MDA 401 and the ELA 405 are both similar and simplified as compared to that shown in FIG. 7 for the optical transceiver and processor 501 and thus is not further described.

Figure 10:
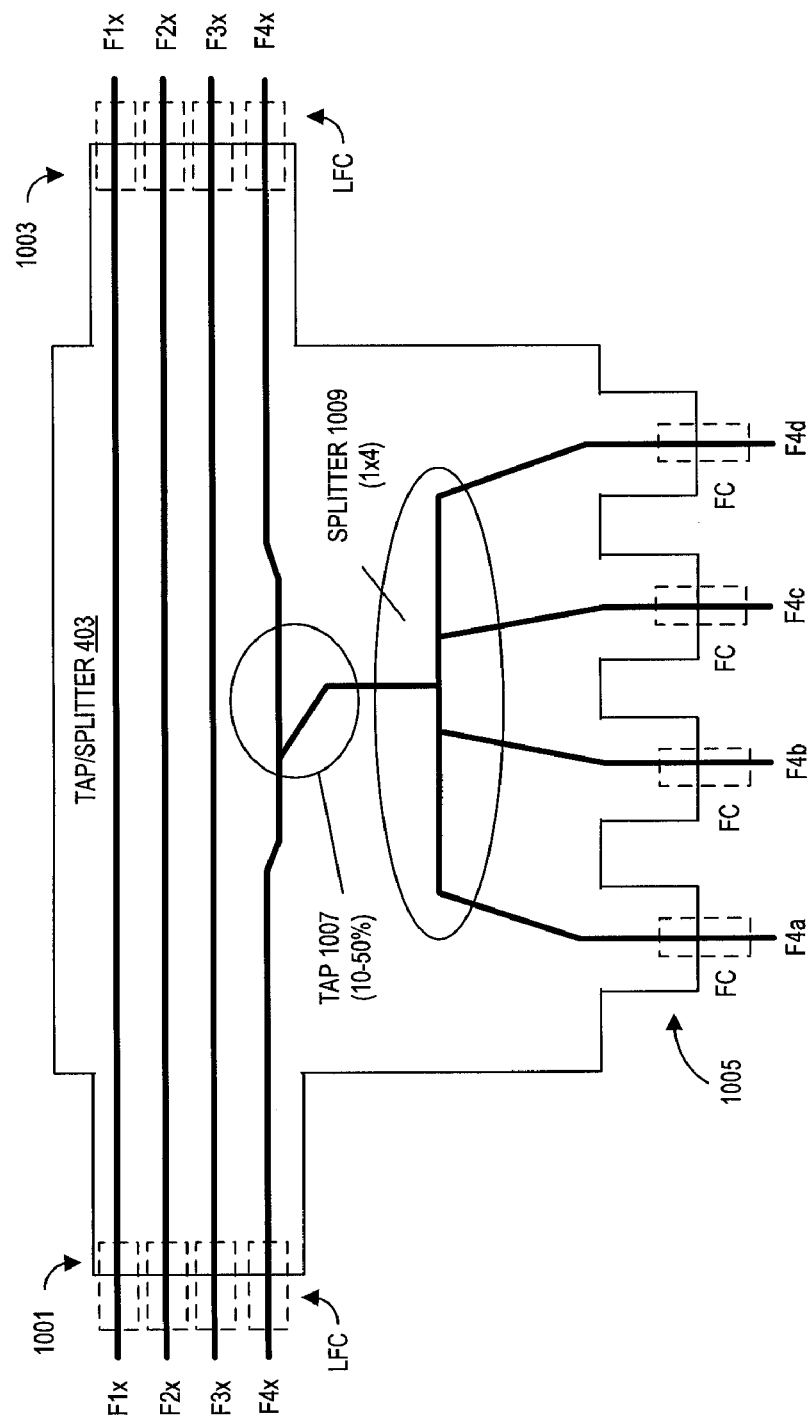
FIG. 10 is a logical optical layout diagram of an exemplary embodiment of the tap/splitter of FIG. 4, which includes one or more upstream ports, a corresponding number of downstream ports, and multiple tap ports.

FIG. 10 is a logical optical layout diagram of an exemplary embodiment of the tap/splitter 403, which includes one or more upstream ports 1001, a corresponding number of downstream ports 1003, and multiple tap ports 1005. Optic fibers F1$x$, F2$x$, F3$x$ and F4$x$ represent the downstream fiber runs of the FTTH node 107 fibers F1, F2, F3 and F4, respectively, which are provided to respective ones of the upstream ports 1001. Three of the fibers F1$x$, F2$x$, and F3$x$ pass through the upstream ports 1001 and the downstream ports 1003 in a continuous without being tapped or split by the tap/splitter 403, whereas the signal of the fiber F4$x$ is tapped and split. Thus, the fiber couplings LFC for the fibers F1$x$-F3$x$ are straight-though fibers without a fused connection in the initial configuration. The LFC for the fiber F4$x$ may be a fused connection at both the upstream port 1001 and the downstream port 1003. In this case, the fiber F4$x$ is provided to an internal directional coupler or tap 1007, which taps off a portion (e.g., 10-50%) of the optical signal of the F4$x$ fiber and provides the tapped portion to an internal splitter 1009. The splitter 1009 divides the tapped signal into multiple separate downstream signals provided onto separate fibers routed to subscriber locations or downstream devices, such as splitters, taps, etc. In this case, the splitter 1009 is a 1×4 splitter that evenly divides the tapped signal into four signals provided on corresponding fibers F4$a$, F4$b$, F4$c$ and F4$d$ at corresponding ones of the tap ports 1005. The fiber couplings at the split downstream fibers F4$a$-F4$d$ are shown as fiber couplings FC since the fibers may be fused or coupled via fiber optic connectors. Although fiber optic connectors insert signal loss, such connections are more convenient for service technicians servicing or repairing the tap/splitter 403.

The amount of the F4$x$ signal tapped by tap 1007 depends on the location of the tap/splitter 403 in the architecture and the relative strength of the signal. A tap percentage of anywhere between 10-50% is typical for most applications. The remaining signal is passed to a corresponding output port 1003 carrying the remaining portion of the signal carried on the F4$x$ fiber. Although a 1×4 splitter 1009 is shown, the signal splitter may be split by any practicable number, such as 1×2, 1×3, 1×6, 1×8, etc. The splitter 1009 divides the tapped signal by any desired percentage or proportion, where split signals are not necessarily equal to each other. For example, if 3 of the 4 split signals are to be provided to subscriber locations and the fourth is to be further tapped or split downstream, then the fourth signal may optionally have a greater percentage of signal strength than the first three to ensure sufficient signal strength for subscriber locations downstream of the port that is split.

FIG. 11 is a diagram illustrating an implementation and use of the exemplary embodiment of the tap/splitter 403 shown in FIG. 10. Four tap/splitters TS1, TS2, TS3 and TS4 are shown in an initial configuration 1100 distributed along a fiber path of multiple fibers, such as along either of the fiber optic paths A or B shown in FIG. 2. In this case, there are four optical fibers numbered 1-4. Each of the tap/splitters TS1-TS4 are configured in a similar manner as the tap/splitter 403 including an internal tap and splitter 1101 and tap ports 1103 that subdivide the signal on a selected fiber into a number of downstream signals on corresponding fibers. In this case, the tap/splitter TS1 subdivides the signal on fiber 4 into W different signals, the tap/splitter TS2 subdivides the signal on fiber 3 into X different signals, the tap/splitter TS3 subdivides the signal on fiber 2 into Y different signals, and the tap/splitter TS4 subdivides the signal on fiber 1 into Z different signals, where W, X, Y and Z are integers. As with the tap/splitter 403, the lower upstream/downstream ports are illustrated as being tapped and split, although this is only a representation as any selected fiber may be tapped and split in any given tap/splitter component. The individual fibers are illustrated crossing over each other (each labeled XOVR) to represent providing a different fiber to the lowest port of downstream tap/splitters, which is represented as the tap/splitter port.

In an initial configuration of the FTTH distribution network 100, such as represented at 1100, the optic fibers are continuous fibers with a minimum number of fiber connectors or fused fibers (or even no connectors or fused points). As illustrated, fiber 1 passes through the tap/splitters TS1-TS3 as a continuous fiber, and is then subdivided into Z different signals by the tap/splitter TS4. Fiber 1 may be further routed to other taps and/or splitters or the like or to a subscriber location or may simply be appropriately terminated downstream of the tap/splitter TS4. Yet fiber 1 does not have any connectors entering or exiting any of the tap/splitters TS1-TS4, so that fiber 1 is either a continuous fiber entering and exiting each tap/splitter or is fused at the port of the tap/splitter TS4. In a similar manner, fiber 2 passes through the tap/splitters TS1 and TS2 as a continuous fiber and is subdivided into Y different signals by the tap/splitter TS3 and then is routed to and through the remaining tap/splitter TS4 without further taps or splits within TS4. Fused connections may be used on fiber 2 at the entry and exit ports of TS3. Fiber 3 passes through the tap/splitter TS1 as a continuous fiber and is subdivided into X different signals by the tap/splitter TS2 and then is routed to and through the remaining tap/splitters TS3 and TS4. Fused connections may be used on fiber 3 at the entry and exit ports of TS2. Fiber 4 is subdivided into W different signals by the tap/splitter TS1 and then is routed to and through the remaining tap/splitters TS2-TS4. Fused connections may be used on fiber 4 at the entry and exit ports of TS1. Each fiber may further be routed to downstream components or subscriber locations or properly terminated.

As understood by those skilled in the art, optic connectors insert signal loss in the fiber path, so that it is preferred to either run a continuous fiber or to fuse the fiber at tap/splitter locations. Such initial configuration 1100 minimizes signal loss and maximizes signal budget in the initial configuration. It is appreciated, however, that optic connectors could be inserted at each upstream, downstream and tap port of each tap/splitter TS1-TS4 for each fiber. In spite of the relatively significant loss inserted by the sum of optic connectors in each fiber run, each fiber path traverses a limited number of zones (e.g., 4-8 zones) and amplifiers are used to boost the signal where and when necessary or desired. And as described above, the optical interfaces at the downstream tap ports may be fiber optic connectors for the convenience of service technicians. A significant benefit of minimizing the number of optic connectors in an initial configuration is to leave a significant remaining signal budget to allow connectors to be inserted at any time in the event of damage of the fiber cable. For example, in the event of damage of the fiber cable carrying the individual fibers 1-4, as illustrated at 1105, where the damage is shown as jagged double line 1102 representing damage to or split of one or more of the individual fibers 1-4 of the cable, repair may be made quickly and easily with optic connectors. As illustrated by a repaired configuration shown at 1107, the repair may be made by inserting an optic connector 1106 at the location of each split in each of the fibers 1-4 within the fiber cable between the tap/splitters TS1 and TS2. An alternative repair configuration is illustrated at 1109, which is a more practical and convenient solution, in which the entire fiber cable segment between the tap/splitters TS1 and TS2 is replaced as shown at 1109 and an optic connector 1106 is inserted at each end of each of the individual fibers 1-4 at the respective ends of the inserted fiber cable segment.

In a conventional configuration such as implemented as a PON, specialized equipment, such as a splicing van with an internal clean environment and very expensive fiber optic splicing equipment, would be required to locate the damage, to access the damaged cable, and then to splice and fuse the individual fibers together to effectuate the repair. In the standard and conventional configuration, the fiber cable carries hundreds if not thousands of individual fibers, and each cable repair requires that each of the split fibers be individually located, spliced, and fused since the conventional architecture cannot afford the signal loss of optical connectors. The standard fiber optic architecture requires that very little signal loss be inserted into each fiber run, so that optic connectors are usually not used. Thus, the process can be expensive and consume a considerable amount of time. The subscriber locations that suffer loss of service may not be restored for a substantial period of time. And the repair process is very costly to the service provider, who typically passes such cost onto the subscribers/consumers.

In contrast, the repair process in either scenario 1107 or 1109 is conducted in a relatively quick and easy manner by a repair crew in the field. The repair crew does not need to have expensive fiber optic splicing equipment for repairing the individual fibers of the cable, and the truck need does not require the standard clean room environment and need not be a full-up splicing van. In accordance with an FTTH architecture implemented according to an embodiment of the present invention, each fiber cable includes a relatively small number of fibers, typically less than ten (e.g., 4), each of which is easily identified by its color coded sleeve, and each may be repaired with a simple optic connector rather than requiring the splicing and fusing process. The repair process illustrated at 1107 is sufficient if the specific location of the damage is known or easily identified. Often, however, the only information of the damage is that the subscriber locations serviced by the tapped ports of the tap/splitter TS1 still have service whereas those serviced downstream from the tap/splitters TS2-TS4 experience complete loss of service. By process of elimination, it is determined that the fiber cable between the tap/splitters TS1 and TS2 is damaged, so that this portion of the cable is replaced as illustrated at 1109. And even if the repair is made with fused connections, the process is much easier as compared to PON architectures since the cable only includes a few fibers as compared to hundreds or thousands. Thus, even the fuse process is completed in much less time.

A sufficient amount of signal strength is available for all downstream subscriber locations even if one or more optic connectors have been inserted in each fiber run (at the point of damage or at either end of each individual fiber in a cable segment). Using optical connectors, the subscriber locations experience loss of service only for a relatively short period of time. The service provider may opt to leave the optical connectors in the network without further repair since the downstream subscriber locations receive adequate signal strength. Alternatively, the service provider may opt to splice and fuse the individual fibers 1-4 immediately or at a later and more convenient time. For example, if there has been a significant number of repairs for a given fiber run over time, it may be advantageous in some situations (to regain signal strength) or even necessary in others (to avoid potential loss of service at the end of the line) for the service provider to remove the optical connectors and splice the individual fibers together. In any event, it is appreciated that an FTTH architecture implemented according to an embodiment of the present invention is significantly more cost effective to establish, operate and maintain than conventional fiber optic configurations.

Figure 12:
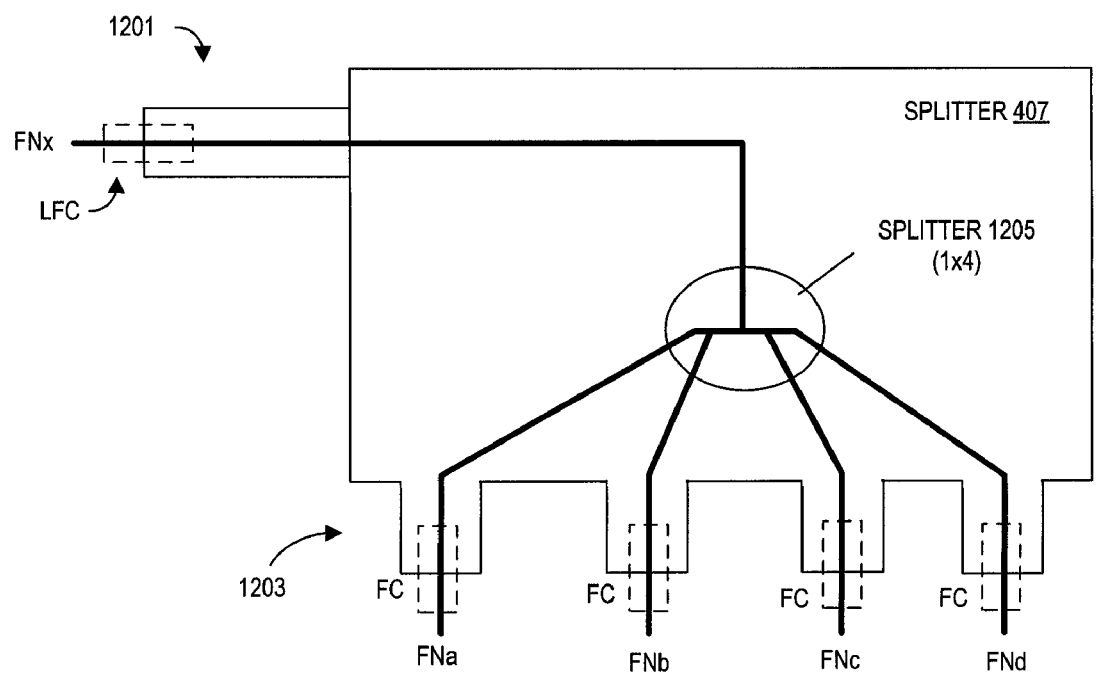
FIG. 12 is a logical optical layout diagram of an exemplary embodiment of the splitter of FIG. 4, which includes an upstream port and multiple downstream ports.

FIG. 12 is a logical optical layout diagram of an exemplary embodiment of the splitter 407, which includes an upstream port 1201 and multiple downstream ports 1203. The upstream port 1201 is shown with a low-loss fiber coupling LFC representing either a continuous fiber or a fused connection, and the downstream ports are shown with a fiber connection LC which is either an LFC or an optical connector as previously described. It many configurations it is deemed more convenient to used connectors between the splitter and the NIU at the subscriber location. A selected optic fiber FNx (in which N is an integer from 1 to 4 representing a selected one of the downstream fiber runs of the FTTH node 107 fibers F1, F2, F3 and F4, respectively), which is provided to the upstream ports 1201. The fiber FNx is provided to an internal splitter 1205. The splitter 1205, which functions in a similar manner as the splitter 1009, divides the signal into multiple separate downstream signals provided onto separate fibers routed to subscriber locations or downstream devices, such as splitters, taps, etc. In this case, the splitter 1205 is a 1×4 splitter that evenly divides the tapped signal into four signals provided on corresponding fibers FNa, FNb, FNc and FNd at corresponding ones of the downstream ports 1203. Also, although a 1×4 splitter is shown, the splitter may be just as easily configured to split the signal by any practicable number, such as 1×2, 1×3, 1×6, 1×8, etc. The splitter 1205 divides the signal by any desired percentage or proportion, where split signals are not necessarily equal to each other in a similar manner as previously described for the splitter 1009.

Figure 13:
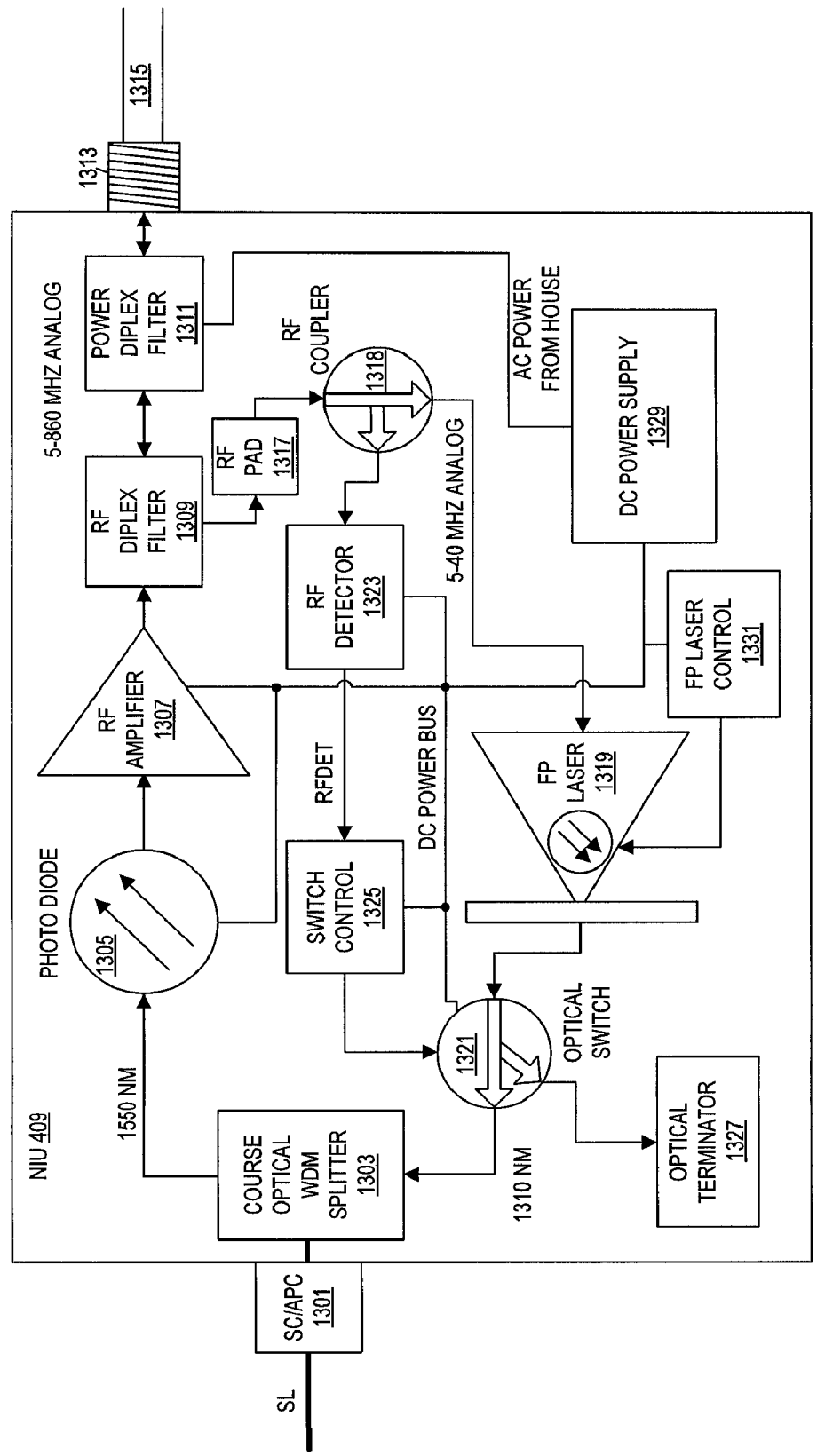
FIG. 13 is a schematic and block diagram of an exemplary embodiment of the NIU of FIG. 4.

FIG. 13 is a schematic and block diagram of an exemplary embodiment of the NIU 409, and the NIU 413 is substantially identical. The subscriber link fiber optic segment, shown as a fiber SL, is provided to a course optical WDM splitter 1303 within the NIU 409 via an optic connector 1301. The course optical WDM splitter 1303 enables the forward red signal to pass to a photo diode 1305. The photo diode 1305 converts the optical red signal to a forward RF signal (e.g., 50-860 MHz), which is provided to the input of an RF amplifier 1307. The output of the RF amplifier 1307 provides an amplified RF signal which is filtered by an RF diplex filter 1309 and then by a power diplex filter 1311, which interfaces a coaxial cable 1315 via a coaxial cable connector 1313. The coaxial cable 1315 is routed to various components at the corresponding subscriber location for delivering content carried by the red signal.

Signals generated at the subscriber location, such as subscriber commands or computer communications for the internet or the like, are converted and multiplexed onto a 5-40 MHz signal provided through the power diplex filter 1311 and the RF diplex filter 1309 and provided to an RF Pad 1317. The RF Pad 1317 outputs the signal to an RF coupler 1318, which provides the RF signal to an FP laser amplifier 1319. The laser amplifier 1319 converts the RF signal to a corresponding green signal provided to an input of an optical switch 1321. The optical switch 1321, when activated, provides the green signal via a first output to an input of the course optical WDM splitter 1303. The optical WDM splitter 1303 asserts the green signal onto the fiber SL via the connector 1301 for delivery to the FTTH node 107 or optional MDA 401 or ELA 405 in the reverse or upstream direction (and thus is one of the multiple reverse green signals). It is noted that upstream optical collisions between the multiple reverse green signals are eliminated through communication protocols already in place that ensure that the NIUs 109 of the fiber plant do not transmit simultaneously. Also, the source of the optical analog green signals (originating at the NIUs 109) is not apparent or pertinent to upstream processing circuits (e.g., 611, 807, 907 and circuits 715, 716, 717 of processor 501). Rather, the processing circuits are agnostic to the contents of the optical signals and simply convert the optical analog signals to optical digital signals for interpretation by the headend 103. The RF coupler 1318 has a second output which provides the RF signal, or a portion or variation thereof, to an RF detector 1323. The RF detector 1323 generates an RF detection signal RFDET to a switch controller 1325, which activates the optical switch 1321 when reverse RF signals are detected for enabling the green signal generated at the output of the laser amplifier 1319 to pass to the course optical WDM splitter 1303. When not activated, the optical switch 1321 switches its output to an optical terminator 1327 for terminating the optic signal when not in use. A DC power supply 1329 provides power to various components of the NIU 1311 including an FP laser control circuit 1331, which controls operation of the laser amplifier 1319.

In operation, the switch controller 1325 turns on the optical switch 1321 to provide reverse green signals to the course optical WDM splitter 1303 only when a reverse RF signal is detected, or only at the appropriate time that reverse signals are allowed to be transmitted by the NIU 409. Otherwise the reverse signal path is diverted to eliminate reverse green signals from subscriber locations that are not actually sending information. The illustrated embodiment shows a switched return laser (on/off) solution in which the optical path in the forward or upstream direction is turned on and off as needed. For this technique, the return signals are processed and buffered into a TDM format. The size of the available return bandwidth depends on the number of customers on the carrier. For a very simplified example, if 50 customers shared a forward bandwidth of 2.4 gigabits per second (Gbps), then a 2.4 Gbps laser is used to turn on and off slightly less than every 1/50 of a second. All of the transmitters are synchronized to the same 2.4 GHz frame rate with allowances for the known differences in network delays. The transmitter only sends the data sync framework in the 49 slots that belong to other users. In this manner the laser could turn on early enough to stabilize before sending a packet and have some trailing energy afterwards which insures that there are no glitches in the sync framing. There is also the opportunity to allow users additional bandwidth since statistically there would be a large percentage of idle packets. In one embodiment, heavy users are assigned more than one time slot if and when additional time slots are available.

There are many alternative options for the reverse communications from the subscriber locations to the headend. One significant technical challenge is managing or otherwise avoiding the combined energy back through the network from the optical sources from every active subscriber location. Depending on the number of combined sources, the network configuration potentially adds noise and distortions not found in a point to point single source optical link. In the on/off solution illustrated and other scenarios described below, the various signals collected from the subscriber location network are digitized. This involves an A/D conversion of the traditional 5-40 MHz analog band. There are opportunities to apply additional techniques such as DSP (Digital Signal Processing) to augment and enhance the return capabilities and capacity that may be implemented depending on their cost benefits. In the various scenarios described in which the incoming signals are processed and digitized, the resultant data stream is buffered and multiplexed (e.g., TDM) into a larger bit rate during the combining process. For the shared 2.4 Gbps among 50 subscriber location example, each subscriber location uniquely has about 48 megabits per second (Mbps) less overhead (e.g., framing, error correction, etc.). Typical return bandwidths in existing HFC networks including HSD, voice-over-IP (VoIP), and video-on-demand (VOD) typically do not exceed one Mbps with all services simultaneously active at the same time. It is also assumed in all cases that some number of customers share a given return wavelength.

In one alternative configuration, the return path of each subscriber location is attenuated rather than being turned completely off, and only as needed. This solution mirrors the on/off concept except that it allows that since there can be no data collisions, the only hurdle to overcome is the combined noise power generated by all of the transmit sources. If the inactive sources were attenuated significantly (e.g., 10-20 dBc) then the same objective is achieved.

Another alternative solution is a multiple wavelength method, which takes advantage of the fact that a typical EDFA has a 14-40 nanometer (nm) bandwidth. This method also does not require expensive filters to be implemented in the NIU. In this case, DWDM filters are placed at the headend or central office to sort the return colors. 10 colors spaced at 200 GHz are easily fit within the 14 nm bandwidth of the amplifier (although there may be linearity issues to be addressed in the EDFA amplifier (e.g., 703) to accommodate 10 colors). This solution may require a relatively clean, frequency stable, laser transmitter at the NIU, which may be costly. The cost of such a laser transmitter may be offset, however, by a simpler data process. It is possible to implement a straightforward A/D conversion of the bandwidth without further processing.

Another solution is an SCDMA (Synchronous Code Division Multiple Access) approach either with or without FDM. In this approach the return data information at the NIU is converted to an SCDMA output. The SCDMA carrier is wide enough to have enough processing gain to work within the very noisy environment of 100 combined laser transmitters, eliminating the need to "switch" inactive users. This is a robust signal protocol, which has been observed as recovering from 10 dBc below the analog noise floor with very good signal BER (Bit Error Rate) quality. Since the return signals do not have any bandwidth limitation, an FDM channelization between SCDMA groups can be overlaid to lower the number of users, which may reduce the electronics cost in the network.

Another solution is the use of consolation and conversion at the EDFA amplifiers. If it is assumed that the average Return amplifier has 50 or less active users, some tradeoffs are made to lower costs in the NIU by recovering the combined signals in the amplifier with an O/E conversion, processing the signal and retransmitting the combined signal on a separate wavelength (possibly 1490, 1310, or 1550 depending on the NIU's output). Then two conversions are made at the former node location, one for the local, unamplified NIU and another for the amplified ($2^{nd}$ frequency) group. The two groups are then combined for transmission back to the headend or central office.

The downstream function of the optical tap is that it acts on a fiber optic plant in a similar manner as traditional (RF) taps work on a coaxial plant. A portion of the amplified signal broadcast downstream from a node or zone amplifier is "tapped" and split evenly to each of the subscribers that are connected to the tap. Untapped optical signal is propagated downstream for use by other taps. This is different from other fiber to the home (FTTH) architectures in that other such end user splitting devices are at the end of the optical signal's transmission. In this architecture, the downstream signal my be further amplified via nodes or zone amplifiers several times with portions of the signal then tapped and distributed to subscribers along the transmission route.

The optical tap acts independent of the upstream collision domain which may employed. Depending upon the NIU in use, the tap supports the encoding of RF upstream transmission devices in the same way devices are polled in existing coaxial HFC plants today—given that the RF signal source has been converted to analog fiber transmissions by the NIU. Similarly, the tap works seamlessly if an NIU is polled by the node or zone amplifier for upstream signals that could occur in baseband digital format. Fundamentally, given a cable plant built with this architecture, no changes are needed to the fiber or taps in order for it to support 1) analog fiber upstream and downstream, 2) analog fiber downstream and baseband digital upstream, or 3) bidirectional baseband digital transmission. The NIU, the optical node and/or the zone amplifier and the customer premises equipment (e.g., the high speed data modem, set top box, etc.) may be configured to support any of these embodiments.

The NIUs in this architecture are as simple as an optical detector and RF converter (for receipt of downstream only broadcast signals), to bidirectional analog fiber transmissions with signals encoded using traditional HFC cable plant technologies, to analog fiber downstream with baseband digital upstream, to baseband digital bi-directionally, to baseband digital downstream with unique laser colors (frequencies) for each home upstream, to unique laser colors (frequencies) bi-directionally. The basic architecture and cable plant (fiber and taps) supports any of these configurations without modification.

An optical conversion device for a shared FTTH distribution network according to an embodiment of the present invention includes first and second optical fibers and an optical processing circuit. The optical processing circuit has an input for receiving a first optical analog signal carried by the first optical fiber and an output for providing a first optical digital signal for transmission via the second optical fiber. The optical processing circuit is configured to digitize the first optical analog signal and incorporate it into the first optical digital signal. In this manner, the resulting architecture employs a combined optical analog and optical digital protocol that supports analogous communications of existing HFC networks to minimize the cost of a fiber optic upgrade. In order to convert an existing HFC cable plant to an FTTH distribution network, the HFC node is converted to an optical fiber to fiber interface called an FTTH node, the network interface units (NIUs) are inserted at the subscriber locations to convert electrical signals to optical signals, optical taps and splitters are added to propagate optical signals in both directions of the fiber optic plant between the FTTH node and the subscriber locations, and fiber optic cable replaces coaxial cable between the FTTH node and the NIUs. The resultant fiber optic plant (i.e., the fiber optic cable, taps and splitters) operates as a "dumb-pipe" which directly supports most variations of optical communications thus minimizing the cost of future upgrades to more sophisticated optical communications.

The optical analog signal may be an optical signal which is modulated by a radio-frequency (RF) signal. The RF signal is the same or similar to the electrical signals propagated along cable of existing HFC networks. Instead of propagating electrical signals at relatively high loss along coaxial cables, however, the electrical signals are converted to optical signals in the NIU which are then propagated (in a reverse direction) through the fiber optic cable plant and one or more optical conversion devices upstream (e.g., to the headend via an FTTH node). The optical processing circuit may be implemented as an optical to electrical to optical (OEO) converter, which converts the optical analog signal to an electrical signal, which re-times and re-shapes the electrical signal, and which converts the re-timed and re-shaped electrical signal into one or more optical digital signals.

The optical conversion device may include optical splitters which allow passage of the reverse optical signals to the FTTH node along with an optical forward signal originating from the FTTH node to be distributed downstream to the subscriber locations. The optical conversion device may include an optical amplifier to amplify the forward optical signal. The optical forward signal may be either analog or digital in nature. The reverse optical analog signals that are digitized may be combined with other reverse optical digital signals using a directional coupler, which passively combines optical digital signals that are being transmitted on separate, non-overlapping wavelengths within a specified frequency band. Alternatively, the optical processing circuit may be configured to digitize optical analog signals and to combine the digitized signals with other digital signals to provide a combined optical digital signal. In more specific configurations, the optical analog signals are converted to electrical analog signals and digitized via an analog to digital (A/D) converter. The optical digital signals are also converted to an electrical digital signal. The separate electrical digital signals are then interleaved into a combined electrical digital signal and then converted to an optical digital signal, which is then propagated upstream to the FTTH node.

An optical network according to an embodiment of the present invention includes first and second optical fibers, a first NIU which converts a first electrical signal (e.g., originating from a subscriber location for transmission upstream to the FTTH node) to a first optical analog signal and which asserts the first optical analog signal onto the first optical fiber, and a first optical processing device having an input coupled to the first optical fiber and an output coupled to the second optical fiber. The optical processing device converts the first optical analog signal to a first optical digital signal and provides the first optical digital signal to the second optical fiber.

The optical network may further include a third optical fiber, a second NIU which converts a second electrical signal (e.g., originating from another subscriber location for transmission upstream to the FTTH node) to a second optical analog signal and which asserts the second optical analog signal onto the third optical fiber, and a tap. The tap interfaces the third optical fiber with the first optical fiber and passes the first and second optical analog signals to the first optical processing device via the first optical fiber. It is noted that optical analog collisions between the first and second optical analog signals are eliminated through communication protocols already in place that ensure that the first and second NIUs do not transmit simultaneously. In this case, the first optical processing device combines the first and second optical analog signals into the first optical digital signal. It is noted that the source of the optical analog signals (i.e., the first or second NIUs) is not apparent or pertinent to the first optical processing device. Rather, the device simply converts all optical analog signals to optical digital signals for interpretation by the Headend. The first optical conversion device may further receive and propagate or amplify a forward optical signal from the second optical fiber to the first optical fiber, where the forward optical signal is propagated down to the NIUs of the network.

The optical network may include third and fourth optical fibers, a second optical processing device having an input coupled to the second optical fiber and an output coupled to the third optical fiber, a second NIU which converts a second electrical signal to a second optical analog signal and which asserts the second optical analog signal onto the fourth optical fiber, and a tap. In this case, the tap interfaces the fourth optical fiber with the second optical fiber and passes the second optical analog signal on the second optical fiber to the second optical processing device. The second optical processing device combines the second analog signal with the first optical digital signal into a second optical digital signal and provides the second optical digital signal to the third optical fiber. The second optical conversion device may also be configured to pass a forward signal downstream in the network.

A method of processing optical signals in an FTTH distribution network according to an embodiment of the present invention includes receiving an optical analog signal from a first optical fiber, converting the optical analog signal to a first optical digital signal, and providing the first optical digital signal to a second optical fiber. The method may include receiving a second optical digital signal from the first optical fiber, combining the first and second optical digital signals into a combined optical digital signal, and providing the combined optical digital signal to the second optical fiber. The method may include passively combining using a directional coupler. Alternatively, the combining may include converting the optical analog signal into an analog electrical signal, converting the analog electrical signal into a first digital electrical signal, converting the second optical digital signal into a second digital electrical signal, interleaving the first and second digital electrical signals into a combined electrical signal, and converting the combined electrical signal into the combined optical digital signal. The method may include passing a forward optical signal from the second optical fiber to the first optical fiber, and optionally amplifying the forward optical signal.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. An optical conversion device for interfacing first and second optical fibers of a shared FTTH distribution network, comprising:
   an optical processing circuit, having a first input for receiving a first optical analog signal carried by said first optical fiber and an output for providing a first optical digital signal for transmission via said second optical fiber, wherein said optical processing circuit is configured to digitize said first optical analog signal and incorporate into said first optical digital signal;

a first optical splitter having an input/output (I/O) for coupling to said first optical fiber, an input for receiving and passing a first forward optical signal carried by said second optical fiber to said first optical fiber, and a first output coupled to said first input of said optical processing circuit for passing said first optical analog signal; and a second optical splitter having an I/O for coupling to said second optical fiber, an output for passing said first forward optical signal, and an input coupled to said output of said optical processing circuit for receiving and providing said first optical digital signal to said second optical fiber.

2. The optical conversion device of claim 1, wherein said first optical analog signal comprises an optical signal which is modulated by a radio-frequency (RF) signal.

3. The optical conversion device of claim 1, wherein said optical processing circuit comprises an optical to electrical to optical converter, which converts said first optical analog signal to an electrical signal, which re-times and re-shapes said electrical signal, and which converts said re-timed and re-shaped electrical signal into said first optical digital signal.

4. The optical conversion device of claim 1, further comprising an optical amplifier having an input coupled to said output of said second optical splitter and an output coupled to said input of said first optical splitter, wherein said optical amplifier amplifies said first forward optical signal.

5. The optical conversion device of claim 1, further comprising:

said first optical splitter further having a second output for passing a second optical digital signal carried by said first optical fiber;

a directional coupler having a first input coupled to said second output of said first optical splitter for receiving said second optical digital signal, a second input coupled to said output of said optical processing circuit for receiving said first optical digital signal, and an output providing a combined optical digital signal, wherein said directional coupler combines said first and second optical digital signals into said combined optical digital signal; and wherein said input of said second optical splitter is coupled to said output of said directional coupler for passing said combined optical digital signal to said second optical fiber.

6. The optical conversion device of claim 5, further comprising an optical amplifier having an input coupled to said output of said second optical splitter and an output coupled to said input of said first optical splitter, wherein said optical amplifier amplifies said first forward optical signal.

7. The optical conversion device of claim 1, wherein:

said first optical splitter has a second output for passing a second optical digital signal carried by said first optical fiber to a second input of said processing circuit;

wherein said optical processing circuit is configured to digitize said first optical analog signal to provide a digitized signal and to combine said digitized signal with said second optical digital signal to provide said first optical digital signal as a combined optical digital signal via said output of said optical processing circuit; and wherein said input of said second optical splitter is coupled to said output of said processing circuit for passing said combined optical digital signal to said second optical fiber.

8. The optical conversion device of claim 7, wherein said optical processing circuit further comprises:

a first photo diode which converts said first optical analog signal to an analog electrical signal;

a second photo diode which converts said second optical digital signal into a first digital electrical signal;

an analog to digital conversion and digital framing circuit which converts said analog electrical signal into a second digital electrical signal;

an interleave circuit which combines said first and second digital electrical signals into a combined electrical signal; and a laser which converts said combined electrical signal into said combined optical digital signal.

9. The optical conversion device of claim 1, the FTTH distribution network further including a third optical fiber, further comprising:

wherein said first optical splitter has a second output for passing a second optical digital signal carried by said first optical fiber to a second input of said processing circuit;

wherein said first forward optical signal is incorporated within a combined forward signal;

wherein said input of said second optical splitter is coupled to said output of said optical processing circuit for receiving and passing said first optical digital signal as a combined optical digital signal to said second optical fiber, and wherein said output of said second optical splitter passes said combined forward signal carried by said second optical fiber;

a third optical splitter having an I/O for coupling to said third optical fiber, a first output for passing a third optical digital signal carried by said third optical fiber to a third input of said optical processing circuit, a second output for passing a second optical analog signal carried by said third optical fiber to a fourth input of said optical processing circuit, and an input for receiving and passing a second forward optical signal onto said third optical fiber;

said optical processing circuit having respective inputs coupled to said first and second outputs of said first and third optical splitters, wherein said optical processing circuit is configured to digitize said first and second optical analog signals and to combine with said second and third optical digital signals to provide said combined optical digital signal to said second input of said second optical splitter for transmission via said second optical fiber;

an optical amplifier having an input coupled to said output of said second optical splitter and an output, wherein said optical amplifier amplifies said combined forward signal and provides an amplified signal at its output; and a fourth optical splitter having an input receiving said amplified signal, a first output coupled to said input of said first optical splitter for providing said first forward optical signal, and a second output coupled to said input of said third optical splitter for providing said second forward optical signal.

10. The optical conversion device of claim 9, wherein said optical processing circuit further comprises:

a first photo diode which converts said first optical analog signal to a first analog electrical signal;

a second photo diode which converts said second optical digital signal into a first digital electrical signal;

a first analog to digital conversion and digital framing circuit which converts said first analog electrical signal into a second digital electrical signal;

a third photo diode which converts said second optical analog signal to a second analog electrical signal;

a fourth photo diode which converts said third optical digital signal into a third digital electrical signal;

a second analog to digital conversion and digital framing circuit which converts said second analog electrical signal into a fourth digital electrical signal;

a digital interleaving circuit which combines said first, second, third and fourth digital electrical signals into a combined electrical signal; and a laser which converts said combined electrical signal into said combined optical digital signal.

11. An optical network, comprising:

a first optical fiber, a second optical fiber and a third optical fiber;

a first network interface unit (NIU) which converts a first electrical signal to a first optical analog signal and which asserts said first optical analog signal onto said first optical fiber;

a first optical processing device having an input coupled to said first optical fiber and an output coupled to said second optical fiber, wherein said optical processing device converts said first optical analog signal to a first optical digital signal and provides said first optical digital signal to said second optical fiber;

a second NIU which converts a second electrical signal to a second optical analog signal and which provides said second optical analog signal to said third optical fiber; and a first tap, interfacing said third optical fiber with said second optical fiber, which provides said second optical analog signal to said second optical fiber.

12. The optical network of claim 11, further comprising:

a fourth optical fiber;

a third NIU which converts a third electrical signal to a third optical analog signal and which asserts said third optical analog signal onto said fourth optical fiber; and a second tap, interfacing said fourth optical fiber with said first optical fiber, which passes said first and second optical analog signals to said first optical processing device via said first optical fiber;

wherein said first optical processing device combines said first and second optical analog signals into said first optical digital signal.

13. The optical network of claim 12, wherein said first optical conversion device receives and propagates a forward optical signal from said second optical fiber to said first optical fiber, wherein said second tap passes said forward optical signal to said fourth optical fiber, wherein said first NIU receives and converts said forward optical signal into a fourth electrical signal, and wherein said third NIU receives and converts said forward optical signal into a fifth electrical signal.

14. The optical network of claim 11, further comprising:

a fourth optical fiber; and a second optical processing device having an input coupled to said second optical fiber and an output coupled to said fourth optical fiber, wherein said second optical processing device combines said second optical analog signal with said first optical digital signal into a second optical digital signal and which provides said second optical digital signal to said fourth optical fiber.

15. The optical network of claim 14, wherein said second optical conversion device receives and propagates a forward optical signal from said fourth optical fiber to said second optical fiber, wherein said first optical conversion device receives and forwards said forward optical signal from said second optical fiber to said first optical fiber, wherein said first tap passes said forward optical signal to said third optical fiber, wherein said first NIU receives and converts said forward optical signal into a third electrical signal, and wherein said second NIU receives and converts said forward optical signal into a fourth electrical signal.

16. A method of processing optical signals in an FTTH distribution network, comprising:

receiving a first optical analog signal from a first optical fiber;

converting the first optical analog signal to a first optical digital signal;

providing the first optical digital signal to a second optical fiber; and providing a second optical analog signal from a third optical fiber to the second optical fiber.

17. The method of claim 16, further comprising:

converting the second optical analog signal to a second optical digital signal;

combining the first and second optical digital signals into a combined optical digital signal; and providing the combined optical digital signal to a fourth optical fiber.

18. The method of claim 17, wherein said combining comprises passively combining using a directional coupler.

19. The method of claim 17, wherein said converting the second optical analog signal and combining comprises:

converting the second optical analog signal into an analog electrical signal;

converting the analog electrical signal into a first digital electrical signal;

converting the second optical digital signal into a second digital electrical signal;

interleaving the first and second digital electrical signals into a combined electrical signal; and converting the combined electrical signal into the combined optical digital signal.

20. The method of claim 16, further comprising passing a forward optical signal from the second optical fiber to the first optical fiber.

21. The method of claim 20, further comprising amplifying the forward optical signal.

* * * * *